(12) United States Patent
Shiba

(10) Patent No.: US 6,434,279 B1
(45) Date of Patent: Aug. 13, 2002

(54) IMAGE REGISTRATION METHOD, IMAGE REGISTRATION APPARATUS AND RECORDING MEDIUM

(75) Inventor: Hisashi Shiba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/320,453

(22) Filed: May 27, 1999

(30) Foreign Application Priority Data

Jan. 6, 1998 (JP) .......................................... 10-151505

(51) Int. Cl.[7] ................................................ G06K 9/32
(52) U.S. Cl. ........................ 382/294; 382/295; 382/293; 382/130; 345/630; 345/629
(58) Field of Search ................................ 382/294, 293, 382/295, 299, 287, 284, 282, 275, 269, 266, 197, 194, 193, 151, 130; 345/629, 630, 634; 348/584

(56) References Cited

PUBLICATIONS

Parker et al.; "Comparison of Interpolating Methods for Image Resampling"; IEEE Transactions on Medical Imaging; vol. MI–2, No. 1; Mar. 1993; pp. 31–39.

Dvornychenko; "Bounds on (Deterministic) Correlation Functions with Application to Registration", IEEE Transactions on Pattern Analysis and Machine Intelligence; vol. PAMI–5, No. 2; Mar. 1993; pp. 206–213.

Huang; "Image Sequence Enhancement", Springer–Verlag; 1981; p. 302–309.

*Primary Examiner*—Leo Boudreau
*Assistant Examiner*—Yosef Kassa
(74) *Attorney, Agent, or Firm*—Foley & Lardner

(57) ABSTRACT

The invention provides a subpixel accuracy registration technique where accuracy is not lost even where an image is subjected to deformation due to influences of the characteristics of the imaging device or noise. A fitting range setting device 105, sets a range of pixels of an input image with large differential values as a fitting range. A function fitting device 104, fits a mono-peak function for each fitting range, and obtains the edge position at subpixel accuracy. Registration is then effected with a pixel accuracy registration device 107. A corresponding candidate curve generating device 108, with respect to an edge point on a certain one image, makes a corresponding plurality of edge points on an other image corresponding candidate curves joined in a curve. A misregistration computing device 109, obtains the point where all of the corresponding candidate curves intersect or where most are concentrated, and considers the coordinate thereof to be displacement at subpixel accuracy from one image to the other image.

7 Claims, 11 Drawing Sheets

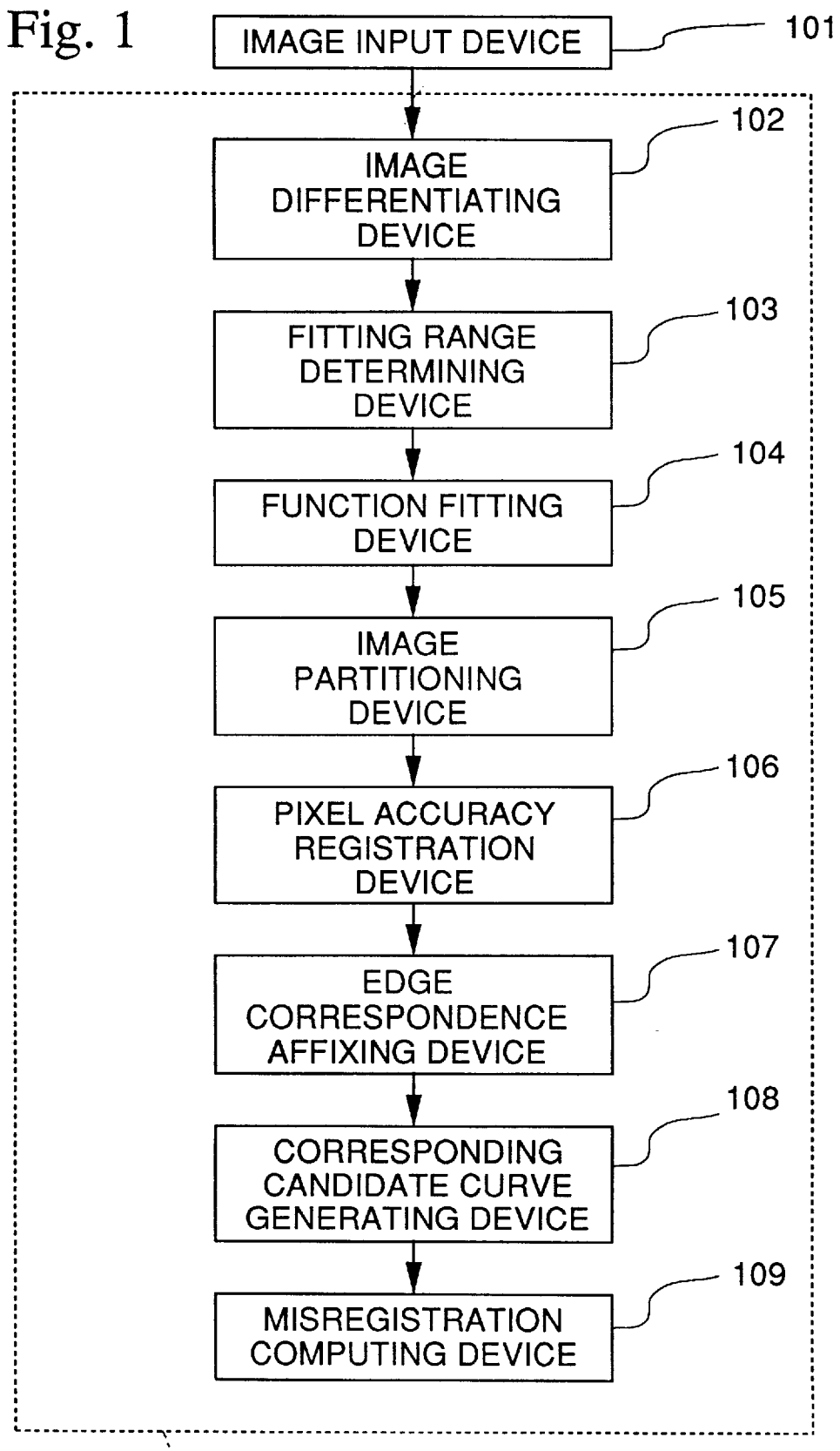

INPUT IMAGE

PARTITIONED TRANSVERSE DIFFERENTIAL IMAGE

LONGITUDINAL EDGE
POSITION IMAGE

TRANSVERSE EDGE
POSITION IMAGE

PARTITIONED LONGITUDINAL DIFFERENTIAL IMAGE OF INPUT IMAGE 1

PARTITIONED LONGITUDINAL DIFFERENTIAL IMAGE OF INPUT IMAGE 2

RESULT OF SUPERPOSITION

RELATIVE CORRESPONDING CANDIDATE CURVE E'

REFERENCE POINT

RELATIVE CORRESPONDING CANDIDATE CURVES

DISPLACEMENT VECTOR

RELATIVE CORRESPONDING CANDIDATE CURVES

DISPLACEMENT VECTOR

MESH THROUGH WHICH MOST CORRESPONDING CANDIDATE CURVES PASS

IMAGE A

IMAGE B

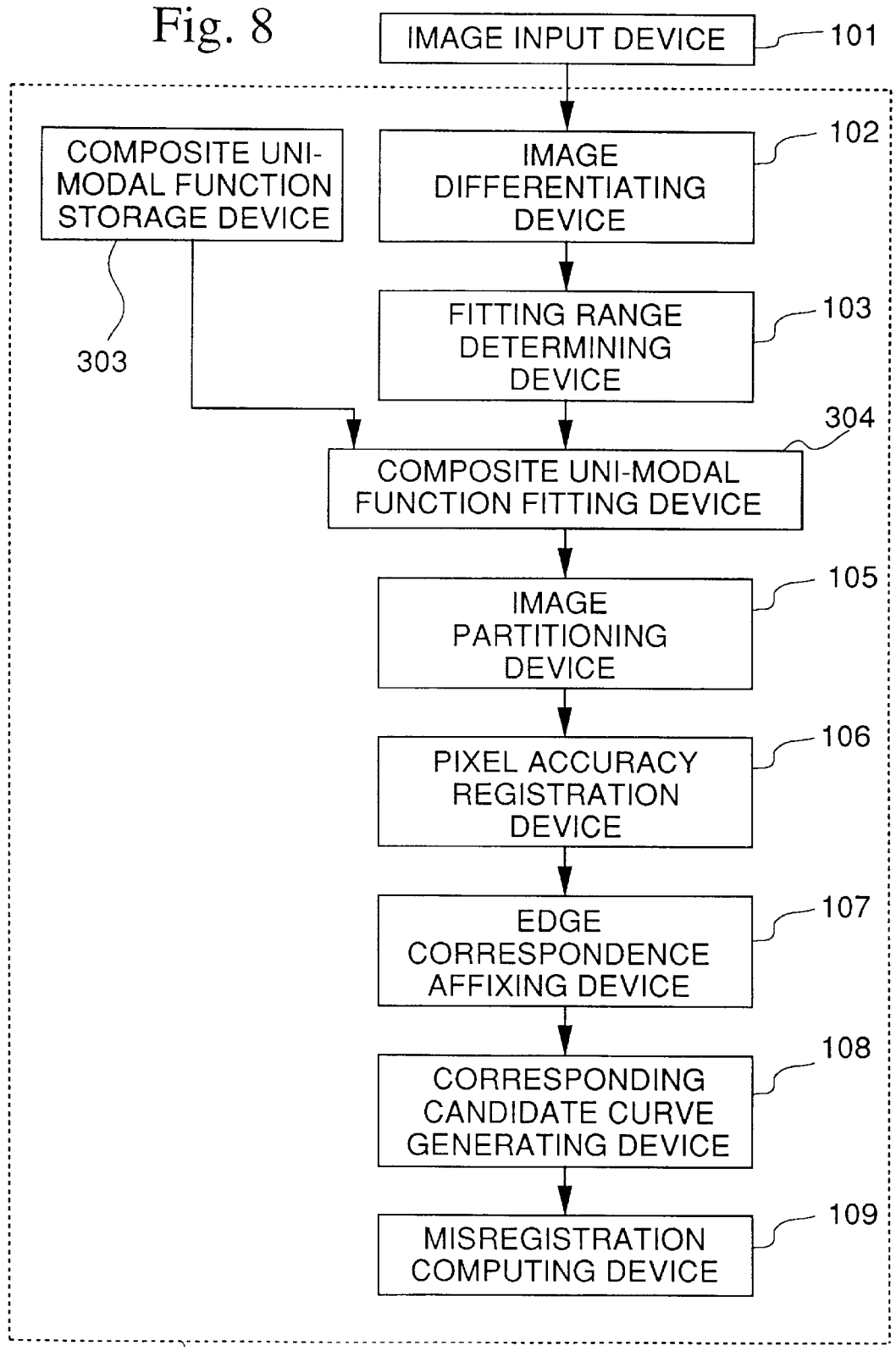

IMAGE REGISTRATION METHOD, IMAGE REGISTRATION APPARATUS AND RECORDING MEDIUM

BACKGROUND OF THE INVENTION

1. Field of the Invention

The present invention relates to a method and apparatus for registering a plurality of digital images at subpixel accuracy (an accuracy finer than the size of a pixel).

2. Background Art

When performing image processing of a digital image, it is desirable to register a plurality of digital images at a finer accuracy than the size of a pixel (subpixel accuracy). Conventional techniques for registering a plurality of images at subpixel accuracy can be roughly divided into three kinds. A first technique is a correlation function interpolation method represented by the technique of V. N. Dvorchenko (V. N. Dvorchenko: "Bounds on (deterministic) correlation functions with applications to registration", IEEE Trans. Pattern. Anal. Mach. Intell., Vol. PAMI-5, No.2, pp.206–213, 1983) which involves performing curve fitting on inter-image cross-correlation functions and obtaining the coordinates of the maximum value points of the cross-correlation functions at subpixel accuracy. A second technique is a gray level value interpolation method represented by the technique of J. A. Parker et.al. (J. A. Parker, R. V. Kenyon, and D. E. Droxel: "Comparison of interpolating methods for image resampling", IEEE Trans. Med. Imaging, Vol. MI-2, No.1, pp.31–39, 1983) which involves for the respective images to be compared, obtaining the gray level values between pixels for one image by interpolation, shifting the image by 1/N pixel units, performing template matching at the other image which is not shifted, and then obtaining the best matching coordinate to thereby obtain the misregistration at an accuracy of 1/N pixels. A third technique is one represented by the technique of T. S. Huang (T. S. Huang: "Image Sequence Analysis", p.303, Springer-Verlag, 1981), being a difference method which involves; considering one image (image A) to be displaced from the other image (image B) in the X direction by an incremental distance Dx, and in the Y direction by an incremental distance Dy, subjecting the gray level value of the image B to a Taylor expansion for Dx and Dy and obtaining a first order simultaneous equation for Dx and Dy from the difference of the gray level values of the image A and the image B, and then solving this equation to obtain Dx and Dy. Hereunder is a detailed description of the difference method. The gray level values of the images to be compared are respectively represented by $f(x, y)$, $g(x, y)$, where $g(x, y)$ is for where $f(x, y)$ is displaced by $(Dx, Dy)$, and can be represented by $g(x, y) = f(x-Dx, y-Dy)$. If $(Dx, Dy)$ is very small, then the difference $I(x, y)$ between $f(x, y)$ and $g(x, y)$ can be represented by:

$$I(x, y) = \frac{\partial f(x, y)}{\partial x} Dx + \frac{\partial f(x, y)}{\partial x} Dy \quad (1)$$

Values of $I(x, y)$ and the partial differentials values of $f(x, y)$ are obtained for various coordinates, and simultaneous equations for $(Dx, Dy)$ in the various coordinates are set up from equation (1). Then by solving these simultaneous equations, $(Dx, Dy)$ being the amount of shift of the relative positions between the two images, are obtained.

With the gray level value interpolation method and the difference method, the ways of representation are different, however these are theoretically the same as the correlation function interpolation method which searches for the point where the cross-correlation function takes a maximum.

With the abovementioned conventional techniques however, the implicitly assumed conditions are that the images to be registered are completely identical images, and only the positions relative to each other are shifted. Therefore in the case where deformation or noise is added to the image, the assumed conditions collapse, with the likelihood of not being able to correctly obtain the misregistration amount. Hereunder examples are given to explain the situation where it is not possible to correctly obtain the misregistration amount with the conventional techniques.

FIG. 10A shows an example of an input image where the gray level value change of a sloping portion on the edge is comparatively gentle, while FIG. 10B shows an example of an input image where the gray level value change of a sloping portion on the edge is comparatively abrupt. The results for where these two input images are registered and superposed are shown in FIG. 10C. In the case where, as shown in FIG. 10A and FIG. 10B, there is only one edge in the image, and the edge profiles are different between the input images, attributable for example to the optical characteristics of the imaging device, then when the above mentioned conventional techniques are used, since as shown in FIG. 10C these are superposed so that the area of the parts which are not superposed becomes a minimum, the edge pair defined by the maximum value point of the first order differential cannot always be superposed. Consequently the misregistration amount cannot be correctly obtained.

FIG. 11A shows an example of an input image with a radius at a corner, that is, the curvature of the corner is comparatively small, while FIG. 11B shows an example of an input image with no radius at the corner, that is, the curvature of the corner is comparatively large. The result of registering and superposing these two input images so that the straight line edge portions coincide is shown in FIG. 11C. Moreover, the result of superposing so that the area of the portions which do not overlap each other is a minimum is shown in FIG. 11D. In the case where in this way, the shapes of the corners of the patterns differ, then with the conventional technique, since these are superposed so that the area of the portions which are not superposed are a minimum, these are superposed with a shift as shown in FIG. 11D rather than with the edge pair lying on top of each other as shown in FIG. 11C.

FIG. 12A shows an example of an input image with a texture on the pattern. FIG. 12B also shows an example of an input image with a texture on the pattern. Of significance is that with the input image of FIG. 12B the texture is positioned slightly towards the edge compared to the input image of FIG. 12A. The result of superposing these two input images so that the edge portions coincide is shown in FIG. 12C, while the result of superposing so that the textures on the patterns coincide is shown in FIG. 12D. In the case where, as with FIGS. 12A and 12B, there is a texture with undulations of subtle gray level values on the pattern, attributable to variations in sensitivity between the respective detection elements of the imaging device or to video jitter and the like due to start timing shift of the respective scanning lines, then there is the likelihood of superimposing with the edge pair slightly shifted as shown in FIG. 12D, rather than with the edge pair superposed as shown in FIG. 12C.

FIG. 13A shows an example of an input image with a texture due to slight periodic noise on the pattern. FIG. 13B also shows an example of an input image with a texture due to a slight periodic noise on the pattern, however, compared to the input image of FIG. 13A, the phase of the periodic noise is shifted slightly towards the edge. The result of superimposing these two input images so that the edge portions coincide is shown in FIG. 13C. The result of superimposing so that the textures due to the slight periodic noise on the patterns coincide is shown in FIG. 13D. In the case where, as shown in FIGS. 13A and 13B, there is a periodic noise having a frequency and an amplitude which is the same for both of the compared images, but the phases of the noise are slightly shifted between images, then the area of the non-coinciding portion for when the images are superposed as shown in FIG. 13D so that the edge pair are not coincidingly overlapped but the periodic noise pair are coincidingly overlapped, is smaller than the area of the non-coinciding portion for when the images are superposed as shown in FIG. 13C so that the edge pair are coincidingly overlapped but the periodic noise pair are not coincidingly overlapped. At this time if registration is made using the abovementioned conventional technique, then the registration becomes as shown in FIG. 13D. Hence accurate registration is not possible. Moreover, also in the case where one peak of the noise is so small that it cannot be known if there is periodic noise or not by viewing with the eye, if there are many of such peaks, the areas of the non-coinciding portions accumulate so that there is the likelihood of a registration error. As an example of such periodic noise, there is the lateral stripes and the like accompanying the non-uniformity of the gray level values between scanning lines, which can often be seen in an interlaced scanning video image.

SUMMARY OF THE INVENTION

It is an object of the present invention to provide a method and apparatus for registering images which can perform registration with good accuracy even in the case where an image which is to be registered is subjected to deformation due to influences of the characteristics of the imaging device or noise.

The method of registering images of the present invention detects relative misregistration between an input first image and second image, and involves: performing differentiation for each of the images, in a longitudinal direction and a transverse direction of each image, and generating a longitudinal differential image having absolute values of longitudinal differential values as pixel values, and a transverse differential image having absolute values of transverse differential values as pixel values; generating a complete differential image from the longitudinal differential image and the transverse differential image; obtaining longitudinal direction fitting ranges for the longitudinal differential image by scanning the pixel values in the longitudinal direction; obtaining transverse direction fitting ranges for the transverse differential image by scanning the pixel values in the transverse direction, and for each of the longitudinal fitting ranges on the longitudinal differential image, fitting a monopeak function in the longitudinal direction, and obtaining the coordinate of the maximum value point separated into subpixel accuracy being an accuracy of less than one pixel, and pixel accuracy, and making this the respective subpixel accuracy longitudinal direction edge position and the pixel accuracy longitudinal direction edge position, and with the pixel corresponding to the pixel accuracy longitudinal direction edge position as the edge pixel, generating a longitudinal direction edge position image having the subpixel accuracy longitudinal direction edge position as the pixel value of this edge pixel, and for each of the transverse fitting ranges on the transverse differential image, fitting a monopeak function in the transverse direction, and obtaining the coordinate of the maximum value point separated into subpixel accuracy being an accuracy of less than one pixel, and pixel accuracy, and making this the respective subpixel accuracy transverse direction edge position and the pixel accuracy transverse direction edge position, and with the pixel corresponding to the pixel accuracy transverse direction edge position as the edge pixel, generating a transverse direction edge position image having the subpixel accuracy transverse direction edge position as the pixel value of this edge pixel, then generating a longitudinal differential image, a transverse differential image, a complete differential image, a longitudinal direction edge position image, and a transverse direction edge position image, respectively corresponding to images of the longitudinal differential image, the transverse differential image, the complete differential image, the longitudinal direction edge position image, and the transverse direction edge position image, which have been to pre-assigned sizes, then for each of the complete differential images, performing registration at an accuracy of one pixel by template matching, of the complete differential image of the first image with respect to the complete differential image of the second image, and in accordance with the result of this registration, registering at an accuracy of one pixel the longitudinal differential image, the transverse differential image, the longitudinal direction edge position image, and the transverse direction edge position image of the first image, with respect to the longitudinal differential image, the transverse differential image, the longitudinal direction edge position image, and the transverse direction edge position image of the second image, and when the longitudinal direction edge position image of the first image is superimposed on the longitudinal direction edge position image of the second image in accordance with the results of the registration at an accuracy of one pixel, making the pixels of the longitudinal direction edge position image of the second image which come into register with the respective edge pixels on the longitudinal direction edge position image of the first image, reference edge pixels, and using the subpixel accuracy longitudinal direction edge position image to obtain the distance between edge pixels, and based on the distance, obtaining the corresponding candidate edge pixel group corresponding to the reference edge pixel, and repeatedly computing in the corresponding candidate edge pixel group, to obtain the corresponding candidate edge pixel group with respect to all of the edge pixels on the longitudinal direction edge position image, and when the transverse direction edge position image of the first image is superimposed on the transverse direction edge position image of the second image in accordance with the results of the registration at an accuracy of one pixel, making the pixels of the transverse direction edge position image of the second image which come into register with the respective edge pixels on the first transverse direction edge position image, reference edge pixels, and then using the subpixel accuracy transverse direction edge position image to obtain the distance between edge pixels, and based on the distance, obtaining the corresponding candidate edge pixel group corresponding to the reference edge pixel, and repeatedly computing in the corresponding candidate edge pixel group, to obtain the corresponding candidate edge pixel group with respect to all of the edge pixels on the transverse direction edge position image, then fitting the subpixel accuracy edge positions of the respective edge pixels of the corresponding candidate edge pixel group with a curve described by a pre-assigned function shape and making this the corresponding candidate curve, and performing coordinate conversion so that the subpixel accuracy edge position of the reference edge pixel becomes the origin, and making the corresponding candidate curve in this coordinate system a relative corresponding candidate curve, and obtaining relative corresponding candidate curves for all of the longitudinal direction edge position images and the transverse direction edge position images, and for all of the edge pixels of the first image, plotting in one plane the respectively corresponding relative corresponding candidate curves of the second image, and obtaining at subpixel accuracy a point where all of the relative corresponding candidate curves intersect, or a point where all of the relative corresponding candidate curves are most concentrated, and making this a corresponding candidate intersection point, and then computing a displacement vector being a vector connecting from the origin of the coordinate system of the plotted plane to the corresponding candidate intersection point.

The apparatus for registering images of the present invention detects relative misregistration between an input first image and second image, and has: an image differentiating device for performing differentiation for each of the images, in a longitudinal direction and a transverse direction of each image, and generating a longitudinal differential image having absolute values of longitudinal differential values as pixel values, and a transverse differential image having absolute values of transverse differential values as pixel values, and generating a complete differential image from the longitudinal differential image and the transverse differential image; a fitting range setting device for obtaining longitudinal direction fitting ranges for the longitudinal differential image by scanning the pixel values in the longitudinal direction, and obtaining transverse direction fitting ranges for the transverse differential image by scanning the pixel values in the transverse direction; a function fitting device for fitting for each of the longitudinal fitting ranges on the longitudinal differential image, a mono-peak function in the longitudinal direction, and obtaining the coordinate of the maximum value point separated into subpixel accuracy being an accuracy of less than one pixel, and pixel accuracy, and making this the respective subpixel accuracy longitudinal direction edge position and the pixel accuracy longitudinal direction edge position, and with the pixel corresponding to the pixel accuracy longitudinal direction edge position as the edge pixel, generating a longitudinal direction edge position image having the subpixel accuracy longitudinal direction edge position as the pixel value of this edge pixel, and for each of the transverse fitting ranges on the transverse differential image, fitting a mono-peak function in the transverse direction, and obtaining the coordinate of the maximum value point separated into subpixel accuracy being an accuracy of less than one pixel, and pixel accuracy, and making this the respective subpixel accuracy transverse direction edge position and the pixel accuracy transverse direction edge position, and with the pixel corresponding to the pixel accuracy transverse direction edge position as the edge pixel, generating a transverse direction edge position image having the subpixel accuracy transverse direction edge position as the pixel value of this edge pixel; an image partitioning device for generating a longitudinal differential image, a transverse differential image, a complete differential image, a longitudinal direction edge position image, and a transverse direction edge position image, respectively corresponding to images of the longitudinal differential image, the transverse differential image, the complete differential image, the longitudinal direction edge position image, and the transverse direction edge position image, which have been to pre-assigned sizes; a pixel accuracy registration device for performing registration, for each of the complete differential images at an accuracy of one pixel by template matching, of the complete differential image of the first image with respect to the complete differential image of the second image, and in accordance with the result of this registration, registering at an accuracy of one pixel the longitudinal differential image, the transverse differential image, the longitudinal direction edge position image, and the transverse direction edge position image of the first image, with respect to the longitudinal differential image, the transverse differential image, the longitudinal direction edge position image, and the transverse direction edge position image of the second image; an edge correspondence affixing device for making, when the longitudinal direction edge position image of the first image is superimposed on the longitudinal direction edge position image of the second image in accordance with the results of registration by the pixel accuracy registration device, the pixels of the longitudinal direction edge position image of the second image which come into register with the respective edge pixels on the first longitudinal direction edge position image, reference edge pixels, and using the subpixel accuracy longitudinal direction edge position image to obtain the distance between edge pixels, and based on the distance, obtaining the corresponding candidate edge pixel group corresponding to the reference edge pixel, and repeatedly computing in the corresponding candidate edge pixel group, to obtain the corresponding candidate edge pixel group with respect to all of the edge pixels on the longitudinal direction edge position image, and when the transverse direction edge position image of the first image is superimposed on the transverse direction edge position image of the second image in accordance with the results of registration by the pixel accuracy registration device, making the pixels of the transverse direction edge position image of the second image which come into register with the respective edge pixels on the first transverse direction edge position image, reference edge pixels, and then using the subpixel accuracy transverse direction edge position image to obtain the distance between edge pixels, and based on the distance, obtaining the corresponding candidate edge pixel group corresponding to the reference edge pixel, and repeatedly computing in the corresponding candidate edge pixel group, to obtain the corresponding candidate edge pixel group with respect to all of the edge pixels on the transverse direction edge position image; a corresponding candidate curve generating device for fitting the subpixel accuracy edge positions of the respective edge pixels of the corresponding candidate edge pixel group with a curve described by a pre-assigned function shape and making this the corresponding candidate curve, and performing coordinate conversion so that the subpixel accuracy edge position of the reference edge pixel becomes the origin, and making the corresponding candidate curve in this coordinate system a relative corresponding candidate curve, and obtaining relative corresponding candidate curves for all of the longitudinal direction edge position images and the transverse direction edge position images; and a misregistration computing device for plotting in one plane for all of the edge pixels of the first image, the respectively corresponding relative corresponding candidate curves of the second image, and obtaining at subpixel accuracy a point where all of the relative corresponding candidate curves intersect, or a point where all of the relative corresponding candidate curves are most concentrated, and making this a corresponding candidate intersection point, and then computing a displacement vector being a vector connecting from the origin of the coordinate system of the plotted plane to the corresponding candidate intersection point.

With the present invention, the edge position of the pattern on the image which is not easily influenced by differences in edge profiles between images, or subtle textures, is obtained at subpixel accuracy by function fitting. Then based on this edge position, the distance between the corresponding edges of the images to be registered is obtained at subpixel accuracy, thereby obtaining the misregistration between images at subpixel accuracy. Moreover, by being able to set a threshold value which excludes the weak edge, then there is minimal susceptibility to noise.

BRIEF DESCRIPTION OF THE DRAWINGS

FIG. 1 is a block diagram showing the construction of an image registration apparatus of a first embodiment of the present invention.

FIG. 8. is a block diagram showing the construction of an image registration apparatus of a third embodiment of the present invention.

DESCRIPTION OF THE PREFERRED EMBODIMENTS

Figure 2A:
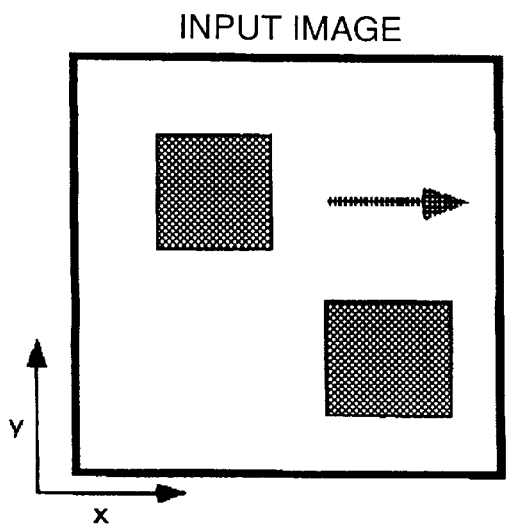
FIG. 2A is a diagram showing an example of an input image, 2B is a diagram showing an example of a transverse differential image of the input image shown in FIG. 2A, 2C is a diagram showing an example of transverse direction gray level value change for an edge portion in a transverse differential image, and 2D is a diagram showing an example of where an edge in the transverse differential image has been fitted in the transverse direction with a mono-peak function.

Next is a description of preferred embodiments of the present invention with reference to the drawings.

First Embodiment

FIG. 1 is a block diagram showing the construction of an image registration apparatus of a first embodiment of the present invention.

The image registration apparatus 100 performs registration of two digital images (referred to hereunder as image A and image B) which have been input to an image input device 101, and computes the misregistration amount. The image registration apparatus 100 comprises: an image differentiating device 102 which generates for the image A and image B, a longitudinal differential image, a transverse differential image and an complete differential image; a fitting range setting device 103 for respectively obtaining from the longitudinal differential image and the transverse differential image, a longitudinal direction fitting range and a transverse direction fitting range; a function fitting device 104 which performs function fitting using a mono-peak function based on the longitudinal direction fitting range, and creates a longitudinal direction edge position image from the longitudinal differential image, and performs function fitting using a mono-peak function based on the transverse direction fitting range, and creates a transverse direction edge position image from the transverse differential image; an image partitioning device 105 which partitions the longitudinal differential image, the transverse differential image, the complete differential image, the longitudinal direction edge position image, and the transverse direction edge position image into pre-assigned sizes, and generates a longitudinal differential image, a transverse differential image, a complete differential image, a longitudinal direction edge position image, and a transverse direction edge position image; a pixel accuracy registration device 106 which performs registration of the image A and the image B at an accuracy of the order of pixel size, by template matching for each complete differential image; an edge correspondence affixing device 107 for obtaining a corresponding candidate edge pixel group by performing correspondence affixing to the edge pixels in the image A and the edge pixels in the image B for each of the edge position images, using the results from registration at an accuracy of the order of pixel size; a corresponding candidate curve generating device 108 for fitting the positions of the respective edge pixels of the corresponding candidate edge pixel group with a curve described by a pre-assigned function shape and making this the corresponding candidate curve, and performing coordinate conversion to give a relative corresponding candidate curve; and a misregistration computing device 109 for obtaining at subpixel accuracy a point where all of the relative corresponding candidate curves intersect at one point, or a point where the relative corresponding candidate curves are most concentrated, and making this the corresponding candidate intersection point, to thereby compute the misregistration amount of the image A and the image B. Hereunder is a detailed description of the respective constituent elements.

The image differentiating device 102 executes differentiation with respect to the image A and the image B respectively, either in parallel or in sequence, in the longitudinal direction and the transverse direction, and generates a longitudinal differential image having absolute values of longitudinal differential values as pixel values, and a transverse differential image having absolute values of transverse differential values as the pixel values, and generates a complete differential image from the longitudinal differential image and the transverse differential image.

The fitting range setting device 103 scans the pixel values in the longitudinal direction with respect to each of the longitudinal differential images of the respective images (image A and image B), makes the pixels which exceed a pre-assigned threshold value edge candidate points, assigns the same label to the edge candidate point pair which are within a control range for which the distance is pre-assigned with respect to two arbitrary edge candidate points on the same scanning line, and in the case where the control range is exceeded, assigns a different label, then affixes labels to all the edge candidate points on the scanning line of the longitudinal direction, and makes the set of the edge candidate points affiliated with the labels for which the number of edge candidate points for affiliation is greater than a pre-assigned threshold value, a longitudinal direction fitting range, and executes the same operation with respect to all of the scanning lines in the longitudinal direction on the longitudinal differential image to obtain the longitudinal direction fitting range. Here, the longitudinal direction scanning line, in the case where the position of the pixels is represented by a two dimensional xy coordinate, is the set of pixels having the same x coordinate values. The fitting range setting device 103, in the same manner, scans the pixel values in the transverse direction with respect to each of the transverse differential images of the respective images to obtain the transverse direction fitting range. The transverse direction scanning line, in the case where the position of the pixels is represented by the two dimensional xy coordinate, is the set of pixels having the same y coordinate values.

The function fitting device 104, with respect to each image A and image B, and for each longitudinal direction fitting range on the longitudinal differential image, performs fitting in the longitudinal direction using a pre-assigned mono-peak function (a function which is convexed and where there is only one maximum value point), and obtains the coordinates of the maximum value point separated into an accuracy of less than one pixel, that is, subpixel accuracy, and pixel accuracy, and respectively makes these the subpixel accuracy longitudinal direction edge position and the pixel accuracy longitudinal direction edge position. The pixel for where the transverse direction coordinate (x coordinate) of the longitudinal direction fitting range is made the transverse direction coordinate, and the pixel accuracy longitudinal direction edge position is made the longitudinal direction coordinate, is made the edge pixel. Furthermore, for the pixel value of this edge pixel, a longitudinal direction edge position image having the subpixel accuracy longitudinal direction edge position is generated. The function fitting device 104, similarly with the transverse differential image, obtains the subpixel accuracy transverse direction edge position and the pixel accuracy transverse direction edge position, and generates a transverse direction edge position image.

The image partitioning device 105 partitions into a pre-assigned size each of the image A and the image B, into the longitudinal differential image, the transverse differential image, the complete differential image, the longitudinal direction edge position image, and the transverse direction edge position image, all obtained as described above, to thereby generate the longitudinal differential image, the transverse differential image, the complete differential image, the longitudinal direction edge position image, and the transverse direction edge position image.

The pixel accuracy registration device 106, using template matching for each of the complete differential images, performs registration at an accuracy of one pixel, that is, at pixel accuracy, of the complete differential image of the image A with respect to the complete differential image of the image B. Then in accordance with the result of this registration, performs registration at pixel accuracy of the longitudinal differential image, the transverse differential image, the longitudinal direction edge position image and the transverse direction edge position image of the image A, with respect to the longitudinal differential image, the transverse differential image, the longitudinal direction edge position image, and the transverse direction edge position image of the image B.

The edge correspondence affixing device 107, when in accordance with the results of the pixel accuracy registration by the pixel accuracy registration device 106, the longitudinal direction edge position image of the image A is superposed on the longitudinal direction edge position image of the image B, makes the pixels of the longitudinal direction edge position image of the image B which come into register with the respective edge pixels C on the longitudinal direction edge position image of the image A, reference edge pixels C', obtains the distance between the edge pixels using the subpixel accuracy edge position, makes the edge pixel of the longitudinal direction edge position image of the image B with the closest distance within a pre-assigned range from the reference edge pixel C', a first corresponding candidate pixel of the edge pixel C, makes the edge pixels with a close distance within the pre-assigned range from the first corresponding candidate pixel in the longitudinal direction edge position image of the image B, a corresponding candidate edge pixel group D of the edge pixel C, and obtains the corresponding candidate edge pixel group for all of the edge pixels on the longitudinal direction edge position image. The edge correspondence affixing device 107 in a similar manner, also obtains the corresponding candidate edge pixel group from the longitudinal direction edge position image for all of the edge pixels on the longitudinal direction edge position image.

The corresponding candidate curve generating device 108 performs fitting of the subpixel accuracy edge position of the respective edge pixels of the corresponding candidate edge pixel group D with a curve described by a pre-assigned function shape, and makes this the corresponding candidate curve, and performs coordinate conversion so that the subpixel accuracy edge position of the reference edge pixel C' becomes the origin, and makes the corresponding candidate curve in this coordinate system a relative corresponding candidate curve, and obtains relative corresponding candidate curves for all of the edge pixels on the longitudinal direction edge position image and the transverse direction edge position image.

The misregistration computing device 109 plots in one plane, for all of the edge pixels of the image A the respectively corresponding relative corresponding candidate curves of the image B, and obtains at subpixel accuracy, the point where all of the relative corresponding candidate curves intersect, or the point where all of the relative corresponding candidate curves are most concentrated, and makes this the corresponding candidate intersection point, and then computes a displacement vector being a vector connecting from the origin of the coordinate system of the plotted plane to the corresponding candidate intersection point. This displacement vector represents the relative displacement amount between the image A and the image B.

Next is a description of the operation of the image registration apparatus 100.

At first, the image differentiating device 102 performs differentiation in the longitudinal direction and the transverse direction with respect to each of the two digital images (image A and image B) input from the external image input device 101, for example by applying a Sorbel filter, and generates a longitudinal differential image having absolute values of the differential values of the longitudinal differential as pixel values, and a transverse differential image having absolute values of the differential values of the transverse differential as pixel values. After this, the image differentiating device 102 computes from the longitudinal differential image and the transverse differential image, for example the square root of the second power sum of the pixel values of the two images, and generates a complete differential image making this result the pixel value.

Control then moves to the fitting range setting device 103. The fitting range setting device 103 at first scans the pixel values in the longitudinal direction with respect to the each of the longitudinal differential images of the image A and the image B, and makes the pixels where the pixel value exceeds a pre-assigned threshold value, the edge candidate pixels. Then label affixing is performed for all of the edge candidate pixels which are on the same scanning line in the longitudinal direction. For two of the edge candidate pixels, with respect to the edge candidate pixel pair where the spacing there between is within a pre-assigned control range, the same labels are given, and with respect to the edge candidate pixels where the spacing from any one of the edge candidate pixels within one group of edge candidate pixels which are given the same label, exceeds the control range, a different label is given. After this, for each of the labels, the number of edge candidate pixels affiliated with the same label is counted. With the labels where the number of edge candidate pixels is greater than a pre-assigned threshold value, the set of the edge candidate pixels affiliated with these labels is made the longitudinal direction fitting range. The fitting range setting device 103 executes the abovementioned operation with respect to all of the scanning lines in the longitudinal direction on the longitudinal differential image, and obtains the longitudinal direction fitting range. With the transverse differential image, the fitting range setting device 103 scans the pixel values in the transverse direction, and performs the same operation as for the case of the longitudinal differential image and obtains the transverse direction fitting range. Of course, the transverse direction fitting range may be obtained before obtaining the longitudinal direction fitting range.

Figure 2B:
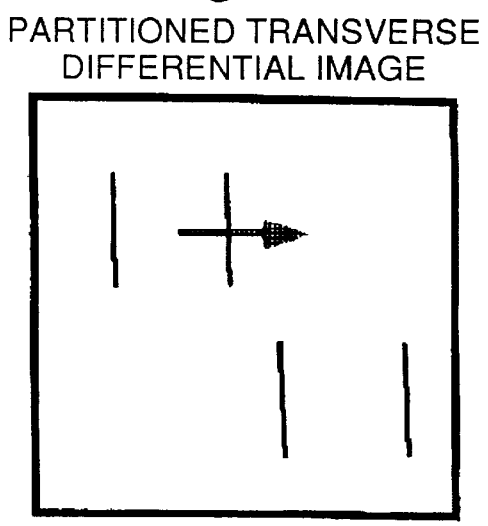
Figure 2C:
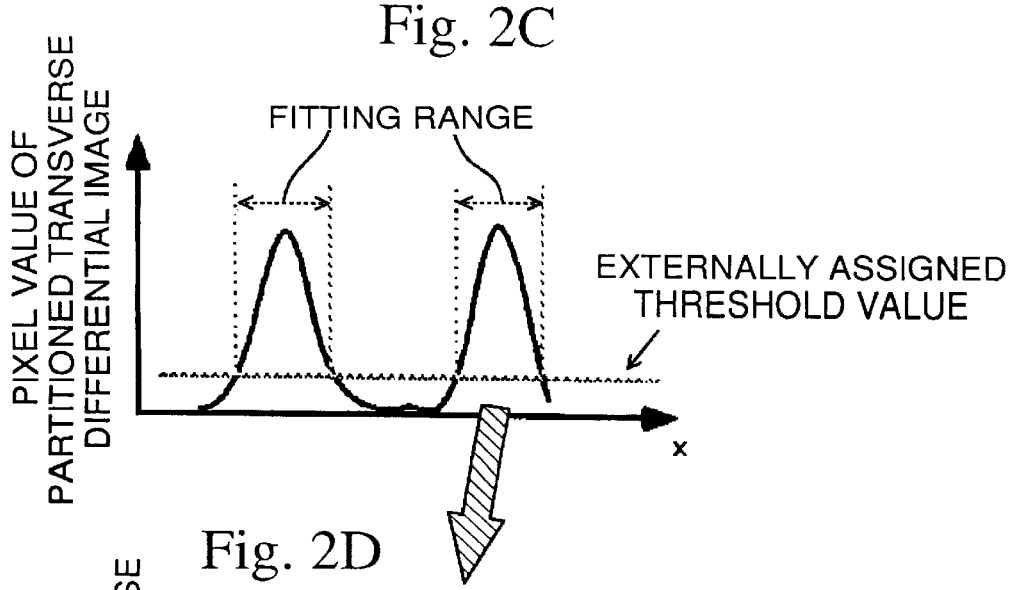

For example, for an input image such as shown in FIG. 2A, if this is performed as far as an image partition to be discussed hereafter, then a transverse differential image such as in FIG. 2B is obtained. The pixel value change in the transverse direction of this transverse differential image becomes as shown in FIG. 2C, with the continuum of pixels with pixel values larger than an externally assigned threshold value made the transverse direction fitting range. Also with respect to the longitudinal differential image, in a similar manner the longitudinal direction fitting range is obtained.

Figure 2D:
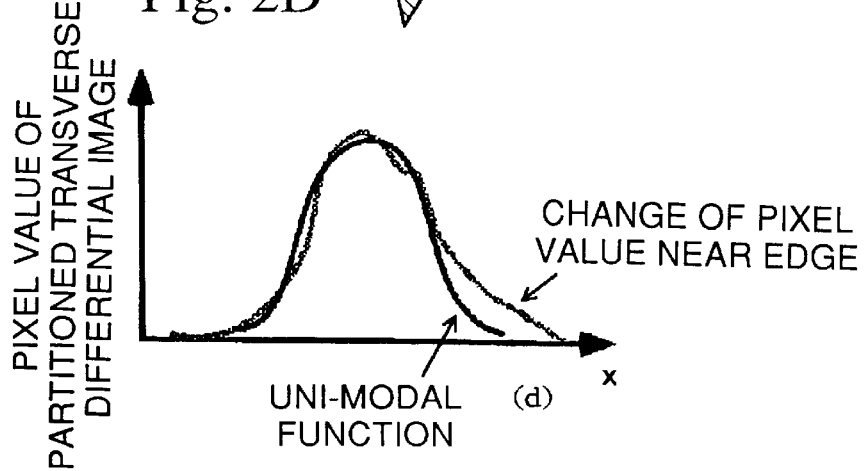
Figure 3A:
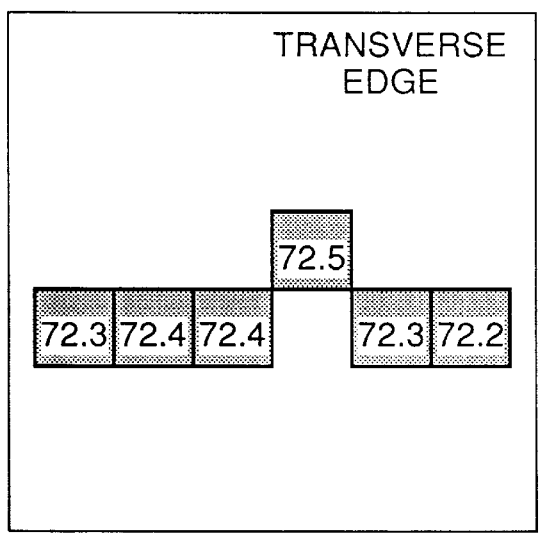
FIG. 3A is a diagram showing an example of a longitudinal direction edge position image, while 3B a diagram showing an example of a transverse direction edge position image.
Figure 3B:
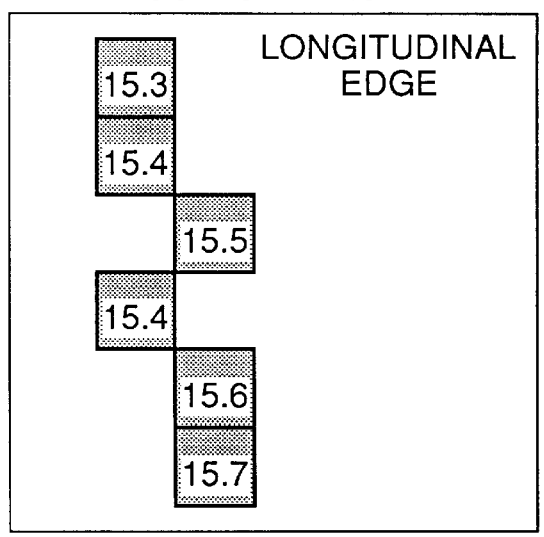

To continue, the function fitting device 104, with respect to the longitudinal differential image, for each longitudinal direction fitting range, performs fitting of a pre-assigned mono-peak function (a function where on the upward protrusion there is only one maximum value point) in the longitudinal direction by means of for example the least squares method (refer to FIG. 2D), and obtains the coordinate of the resultant maximum value point at an accuracy of less than one pixel, that is, at subpixel accuracy, and makes this the subpixel accuracy longitudinal direction edge position. The positions with an accuracy less than the decimal point of the subpixel accuracy longitudinal direction edge position, where 0.5 and over is counted 1 and less than 0.5 discarded, are made the pixel accuracy longitudinal direction edge positions. The function fitting device 104 then generates an image, with the longitudinal and transverse sizes the same as for the input image, and makes this the longitudinal direction edge position image. With a certain longitudinal direction fitting range, then for the case where the transverse direction coordinate thereof is made x1, and the pixel accuracy longitudinal direction edge position obtained in that longitudinal direction fitting range thereof is made y1, the pixel of (x1, y1) of the longitudinal direction edge position image is made the edge pixel which is the pixel constituting the edge, and the pixel value thereof is made the subpixel accuracy longitudinal direction edge position obtained in the longitudinal direction fitting range thereof. The function fitting device 104 also, with respect to the transverse differential image, in the same manner as for the case of the longitudinal differential image, obtains the subpixel accuracy transverse direction edge position and the pixel accuracy transverse direction edge position, and generates a transverse direction edge position image. As a result, the longitudinal direction edge position image and the transverse direction edge position image become for example as in FIGS. 3A and (b) respectively.

Here for the fitting method, instead of the least squares method, a method can be used which involves obtaining in advance the moments of the images using fitting functions, and comparing these with a measured moment of an image to obtain the fitting function. For example, if I (x) is the gray level value change of the image in the transverse direction, x is the transverse direction coordinate, and Ax is the transverse direction fitting range, then the nth order transverse direction moment Mn is defined by:

$$Mn = \int_{A_x} x^n I(x) dx \quad (2)$$

If J (y) is the gray level value change of the image in the longitudinal direction, y is the transverse direction coordinate, and Ay is the transverse direction fitting range, then the nth order longitudinal direction moment Ln is defined by:

$$Ln = \int_{A_y} y^n J(y) dy \quad (3)$$

For example, in the case where the fitting function is a Gaussian (a Gauss type distribution function) defined by:

$$I(x) = A \cdot \exp\{-(x-m)^2/2\delta^2\} \quad (4)$$

then the fitting involves obtaining the parameters A, m, σ in this equation. The zero order moment, that is the area S, the first order moment, that is the center of gravity G, and the second order moment T, of the Gaussian shown by the above equation, are respectively given by:

$$S = \sqrt{2\pi} A\delta,\ G = \sqrt{2\pi} Am\delta,\ T = \sqrt{2\pi} A\delta(\delta^2 + m^2) \quad (5)$$

By assigning the moments S, G, T obtained from the pixel values of the transverse differential images, to the above equations gives the Gaussian parameters A, m, σ. With the longitudinal differential image also, the Gaussian can be fitted in a similar manner.

Even if the images are distorted with respect to each other, if these are finely by a certain degree then the influence of the distortion in the respective images can be disregarded. Therefore, after this, the longitudinal differential image, the transverse differential image, and the complete differential image are into pre-assigned sizes by the image partitioning device 105, and the longitudinal differential image, the transverse differential image, and the complete differential image generated. With the partitioning of the images however, since the differentiation of the image and the function fitting can be executed independently, then the image partitioning device 105 can be disposed between the image input device 101 and the image differentiating device 102, or can be disposed between the image differentiating device 102 and the fitting range setting device 103, or can be disposed between the fitting range setting device 103 and the function fitting device 104.

Once the image partitioning and the function fitting is completed, the pixel accuracy registration device 106 effects the inter-pixel correspondence affixing for the plurality of input images (image A and image B) by template matching, for each complete differential image, and based on this, obtains the displacement of the image A and the image B at an accuracy of one pixel, that is at pixel accuracy.

To continue, the edge correspondence affixing device 107, in accordance with the result of the pixel accuracy registration device 106, superimposes the longitudinal direction edge position image Av of the image A on the longitudinal direction edge position image Bv of the image B. Then, one edge pixel C inside the edge pixel on the longitudinal direction edge position image Av is observed, and in the longitudinal direction edge position image Bv, the pixel which comes into register with the edge pixel C is made the reference edge pixel C'. On the longitudinal direction edge position image Bv, the edge pixel with the closest distance within a pre-assigned range from the reference edge pixel C' is made the first corresponding candidate pixel of the edge pixel C. On the longitudinal direction edge position image Bv, two edge pixels are selected out in order of closeness of distance within the pre-assigned range from this first corresponding candidate pixel, and these two edge pixels are made second corresponding candidate pixels. The edge pixel within the pre-assigned range for each of these two corresponding candidate pixels, and with the closest distance amongst the edge pixels which are not the first corresponding candidate pixel or the second corresponding candidate pixel, is made the third corresponding candidate pixel. By repeating the same operation by a pre-assigned number of times N, up to the Nth corresponding candidate pixel is obtained. The 2×(N−1)+1th edge pixels from the first corresponding candidate pixel to the Nth corresponding candidate pixel are made a corresponding candidate edge pixel group of the edge pixel C, and these are made the corresponding candidate edge pixel group D. By a similar process, the corresponding candidate edge pixel group is obtained for all of the edge pixels on the longitudinal direction edge position image, and the corresponding candidate edge pixel group is also obtained in a similar manner to the case of the longitudinal direction edge position image for all of the edge pixels on the transverse direction edge position image.

Figure 4A:
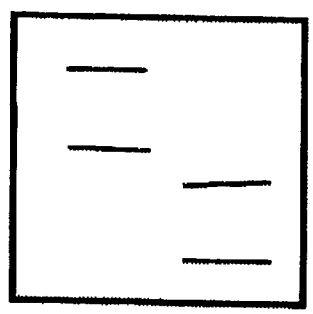
FIG. 4A is a diagram showing an example of a longitudinal differential image for an input image 1 of a plurality of input images, 4B is a diagram showing an example of a longitudinal differential image for an input image 2 of a plurality of input images, 4C is a diagram showing an example where the input image shown by FIG. 4A and the input image .shown by FIG. 4B are superposed at pixel accuracy, 4D is an enlarged diagram of one part of the transverse edge of FIG. 4C, showing an edge pixel C on the input image 1, and an edge pixel D in the vicinity of the edge pixel C and on the corresponding input image 2, 4E is a diagram showing an example of a corresponding candidate edge pixel group made up of the corresponding edge pixel D and edge pixels adjacent to D, for the edge pixel C shown in FIG. 4D, 4F is a diagram showing an example of a corresponding candidate curve obtained by fitting a certain curve for the corresponding candidate edge pixel group of the edge pixel C shown in 4E, and 4G is a diagram showing a relative corresponding candidate curve obtained by subjecting the corresponding candidate curve to coordinate conversion.
Figure 4B:
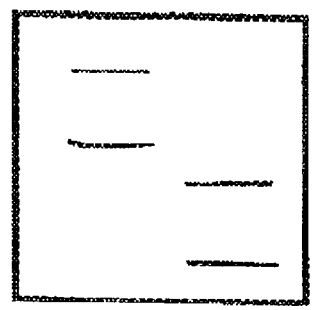
Figure 4C:
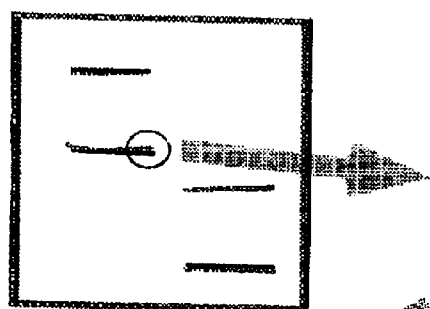
Figure 4D:
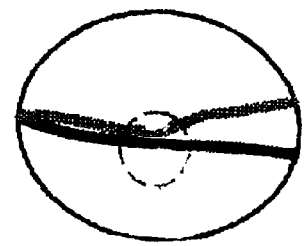
Figure 4E:
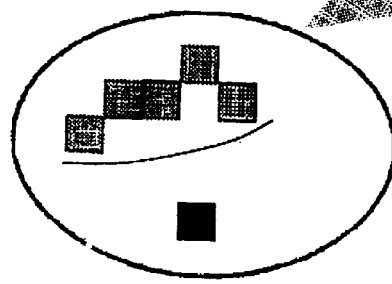

For example, the longitudinal differential image of the image A becomes as shown in FIG. 4A (here represented by black lines). The longitudinal differential image of the image B becomes as shown by FIG. 4B (here represented by gray lines). When longitudinal direction edge position image Av of the image A and the longitudinal direction edge position image Bv of the image B are superimposed in accordance with the displacement obtained by the pixel accuracy registration device 106, this becomes as shown in FIG. 4C. FIG. 4D shows an enlargement of part of FIG. 4C. The corresponding candidate edge pixel group D of the edge pixel C becomes as shown in FIG. 4E.

Figure 4F:
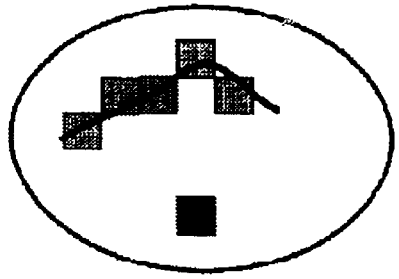

Next, the corresponding candidate curve generating device 108 fits the corresponding candidate edge pixel group D with a curve described by a pre-assigned function shape using for example a least squares method, and makes this the corresponding candidate curve E, and obtains the corresponding candidate curves for all the edge pixels on the longitudinal differential image and the transverse differential image. In the case of the longitudinal direction edge position image, the subpixel accuracy position in the longitudinal direction of the respective edge pixels is the subpixel accuracy edge position being the pixel values of the edge pixels. The subpixel accuracy position in the transverse direction of the edge pixels is made for example the transverse direction center of the pixels. In the case of the transverse direction edge position image, the subpixel accuracy transverse direction edge position is made the subpixel accuracy position in the transverse direction of the edge pixel, and for example the center of the pixel in the longitudinal direction is made the subpixel accuracy position in the longitudinal direction. In accordance with this definition, then for example the corresponding candidate curve for the corresponding candidate edge pixel group shown in FIG. 4E becomes as in FIG. 4F. With the fitting of the curve, the moment may be used as described above in relation to the function fitting device 104.

Figure 4G:
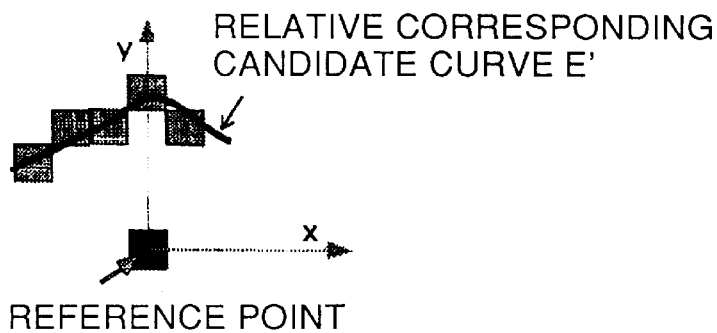

After this, as shown in FIG. 4G, the coordinates are changed so that the subpixel accuracy position of the reference edge pixel C' becomes the origin. Then the corresponding candidate curve E in that coordinate system is made the relative corresponding curve E'. In a similar manner, the relative corresponding candidate curve is obtained for all of the edge pixels on the longitudinal direction edge position image and the transverse direction edge position image.

Next, the misregistration computing device 109 plots in one xy coordinate system, for all of the edge pixels on the longitudinal direction edge position image Av and the transverse direction edge position image Ah of the image A, all of the relative corresponding candidate curves on the longitudinal direction edge position image Bv and the transverse direction edge position image Bh (of the image B), and obtains at subpixel accuracy the point where all of the relative corresponding candidate curves intersect, or the point where all of the relative corresponding candidate curves are most concentrated, and makes this the corresponding candidate intersection point. The vector connecting from the origin of the xy coordinate system to the corresponding candidate intersection point is made the displacement vector. Then by moving the image A in parallel with the direction shown by this displacement vector, and by the distance shown by this displacement vector, the image A is regarded as being exactly superposed on the image B.

Figure 5A:
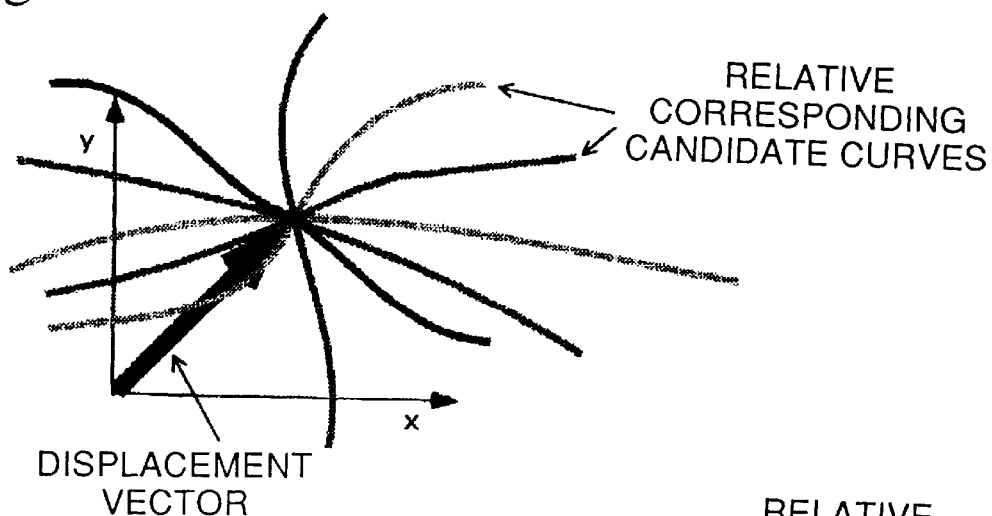
FIG. 5A is a diagram showing an example of a plurality of corresponding candidate curves obtained for a certain edge pixel, with a vector joining the origin of the coordinates with a point where all of the corresponding candidate curves intersect as the displacement vector, 5B is a diagram showing an example of a plurality of corresponding candidate curves obtained for a certain edge pixel, for the case where there is no intersection at one point of all of the corresponding candidate curves, and 5C is a diagram showing an example of the corresponding candidate curves shown in FIG. 5B for where the beforementioned coordinate system is divided up by a mesh, with a vector joining the origin of the coordinates with a mesh through which most corresponding candidate curves pass as the displacement vector.

When the relative corresponding candidate curves have been obtained for all of the edge pixels, a vast number of relative corresponding candidate curves are obtained. In the case where as shown in FIG. 5A, all of the corresponding candidate curves intersect at one point, then the displacement vector being the vector connecting this intersection point with the origin of the co-ordinate system, becomes the displacement of the one input image with respect to the other input image.

Figure 5B:
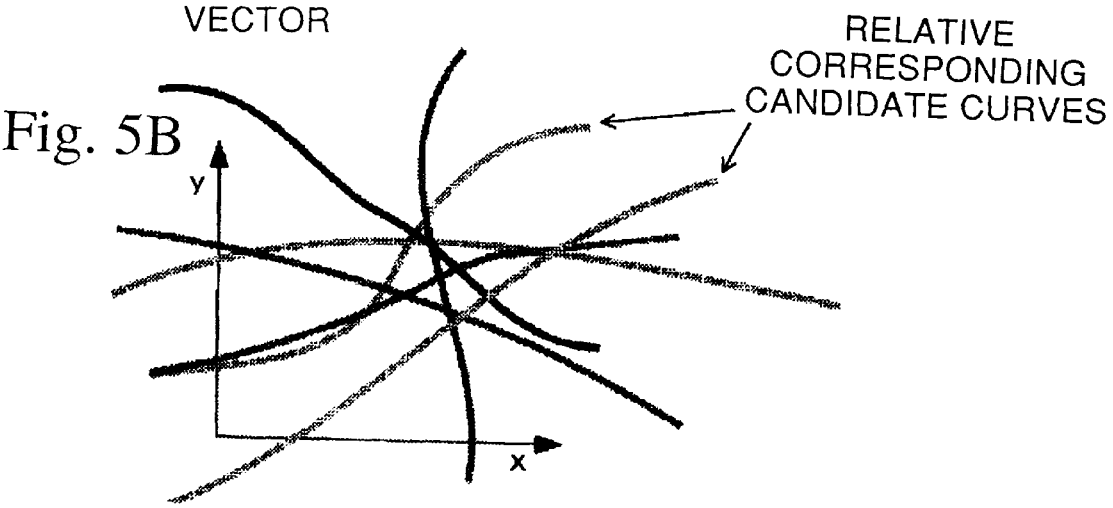

However with an actual image, there is the case as shown in FIG. 5B where due to the influence of noise and the like, the corresponding candidate curves are not connected at one point. At this time, the vector connecting the origin of the coordinate system with the point where all of the corresponding candidate curves are most concentrated is made the displacement vector. Methods for obtaining the point where all of the corresponding candidate curves are most concentrated can be roughly divided into two.

Figure 5C:
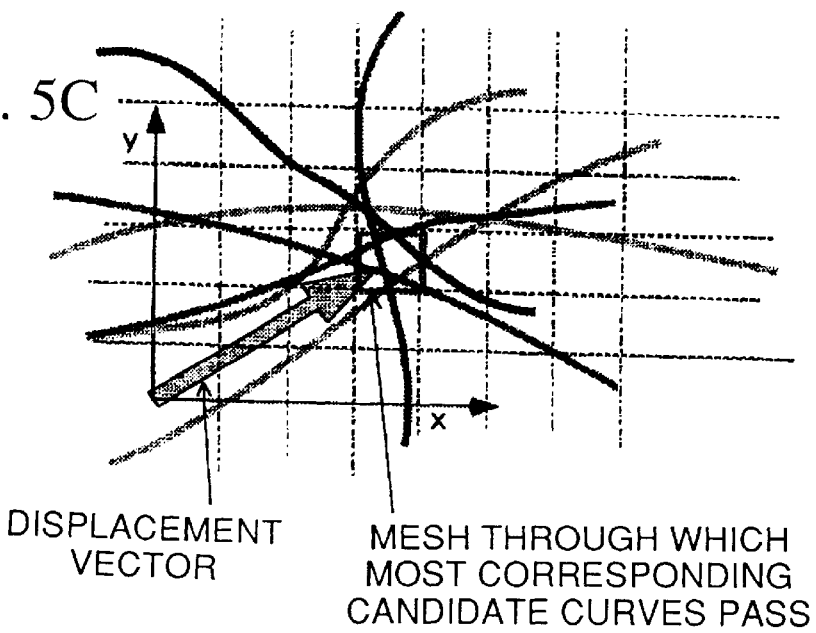

One method, as shown in FIG. 5C, involves partitioning the coordinate system into a certain number of meshes and regarding the vector connecting the origin of the coordinate system to the mesh with the most number of corresponding candidate curves passing therethrough as the displacement vector. With this method however, the accuracy of the deviation vector is determined by the coarseness of the mesh.

Another method involves mathematically obtaining the points which are close to all corresponding candidate curves. Since this method is extremely complex, then the case, being the simplest case, where the corresponding candidate curves are one dimensional curves, that is straight lines, is taken as an example and explained hereunder. Then later, this is expanded to the case of a more typical function. The coordinates of the intersection points can also be obtained by the following method for the case where all of the corresponding candidate curves intersect at one point.

The situation is for N corresponding candidate curves (in this case straight lines). Each straight line is expressed by $a_i x + b_i y + c_i = 0$, (i=1, 2, ..., N). The square of the distance L between a point (x1, y1) and a straight line $a_i x + b_i y + c_i = 0$, becomes:

$$L^2 = \frac{(a_i x_1 + b_i y_1 + c_i)^2}{a_i^2 + b_i^2} \qquad (6)$$

Obtaining the points which are close to all straight line they are from involves obtaining (x', y') which makes $$f(x', y') = \sum_{i=1}^{N} w_i \frac{(a_i x' + b_i y' + c_i)^2}{a_i^2 + b_i^2} \qquad (7)$$

a minimum. Here $w_i$ is a weighting coefficient which is externally assigned beforehand, or is obtained from the edge strength. In the case where externally assigned beforehand, then for example for all of the $w_i$, these can be $w_i=1$. In the case where this is obtained from the edge strength, then for example for one corresponding candidate curve i, this may involve obtaining the maximum value of the fitted monopeak function for each of the corresponding candidate edge pixel groups, and making the average value thereof the weighting $w_i$ for that corresponding candidate curve i. The (x', y') which makes f(x', y') a minimum is obtained using the conditions:

$$\frac{\partial f(x', y')}{\partial x'} = 0, \frac{\partial f(x', y')}{\partial y'} = 0 \qquad (8)$$

From this equation, $$x' = (S_{AB} S_{BC} - S_{AC} S_{BB})/(S_{AA} S_{BB} - S_{AB}^2),$$

$$y' = (S_{AB} S_{BC} - S_{AB} S_{AC})/(S_{AA} S_{BB} - S_{AB}^2)$$

is obtained. Here $$S_{AA} \equiv \sum_{i=1}^{N} \frac{a_i^2}{a_i^2 + b_i^2}, \quad S_{AB} \equiv \sum_{i=1}^{N} \frac{a_i b_i}{a_i^2 + b_i^2}, \quad (9)$$

$$S_{AC} \equiv \sum_{i=1}^{N} \frac{a_i c_i}{a_i^2 + b_i^2}, \quad S_{BB} \equiv \sum_{i=1}^{N} \frac{b_i^2}{a_i^2 + b_i^2},$$

$$S_{BC} \equiv \sum_{i=1}^{N} \frac{b_i c_i}{a_i^2 + b_i^2}$$

However, when $(S_{AA}S_{BB}-S_{AB}^2)=0$, there is no solution. The (x', y') obtained in this way becomes the coordinate of the points which are close to all straight lines. The vector which connects the origin and (x', y') obtained in this way is regarded as a displacement vector which indicates if one image has some misregistration with respect to another image.

Next the case is considered for where N of the before mentioned arbitrary curves are obtained with $y=g_i(x)$, (i=1, 2, . . . N) as the corresponding candidate curves. With the point (x1, y1) given, the difference between this point and the curves $y=g_i(x)$ can be obtained from $x=x_{i,0}$ which makes $$M(x)=\{g_i(x)-y1\}^2+(x-x1)^2$$

a minimum, as $$K=\{g_i(x_{i,0})-y1\}^2+(x_{i,0}-x1)^2$$

On the other hand, $x_{i,0}$ being the x which makes $$M(x)=\{g_i(x)-y1\}^2+(x-x1)^2$$

a minimum, can be obtained from the equation $dM(x)/dx=0$ either analytically or by numerical computation. In this way the $x_{i,0}$, (i=1, 2, . . . N) for all of the corresponding candidate curves are obtained. Obtaining the points which are close to all corresponding candidate curve they are from involves obtaining (x1, y1) which makes $$P(x_1 y_1) = \sum_{i=1}^{N} w_i [\{g_i(x_{i,0}) - y_1\}^2 + (x_{i,0} - x_1)^2] \quad (10)$$

a minimum. Here $w_i$ is a weighting coefficient which is externally assigned beforehand, or is obtained from the edge strength. The wi, can be given by a method the same as for the before-mentioned case where the corresponding candidate curves are straight lines. The (x1, y1) which gives a minimum for P(x1, y1) can be obtained analytically or by numerical computation by solving the simultaneous equations for (x1, y1) obtained from:

$$\frac{\partial P(x_1, y_1)}{\partial x_1} = 0, \quad \frac{\partial P(x_1, y_1)}{\partial y_1} = 0 \quad (11)$$

The vector which connects the origin and (x1, y1) obtained in this way is regarded as a displacement vector which indicates if one image has some misregistration with respect to another image.

A method combining the above-mentioned two methods can also be considered. This involves firstly partitioning with a coarse mesh a coordinate system in which the relative corresponding candidate curves are plotted, and obtaining the mesh through which the most relative corresponding candidate curves pass and then making this mesh a mesh M. Then, for only the relative corresponding candidate curves which pass through this mesh M, the points which are close to all relative corresponding candidate curves are obtained mathematically. By narrowing beforehand the relative corresponding candidate curves whether or not those candidate curves pass through the mesh M, the influence attributable to noise and the like can be removed from the corresponding curves positioned comparatively distant from the corresponding candidate intersection point, so that the accuracy of the corresponding candidate intersection point can be increased.

In addition, a method is also considered where each of the relative corresponding candidate curves are given a gray level distribution of for example a Gaussian distribution in the normal direction to the relative corresponding candidate curves. When a relative corresponding candidate curve having this gray level distribution is plotted in the xy coordinate system, the gray level values rapidly add up. The coordinate of the point where the gray level value ultimately becomes greatest is then obtained at the subpixel accuracy and made the corresponding candidate intersection point.

Second Embodiment

Figure 6:
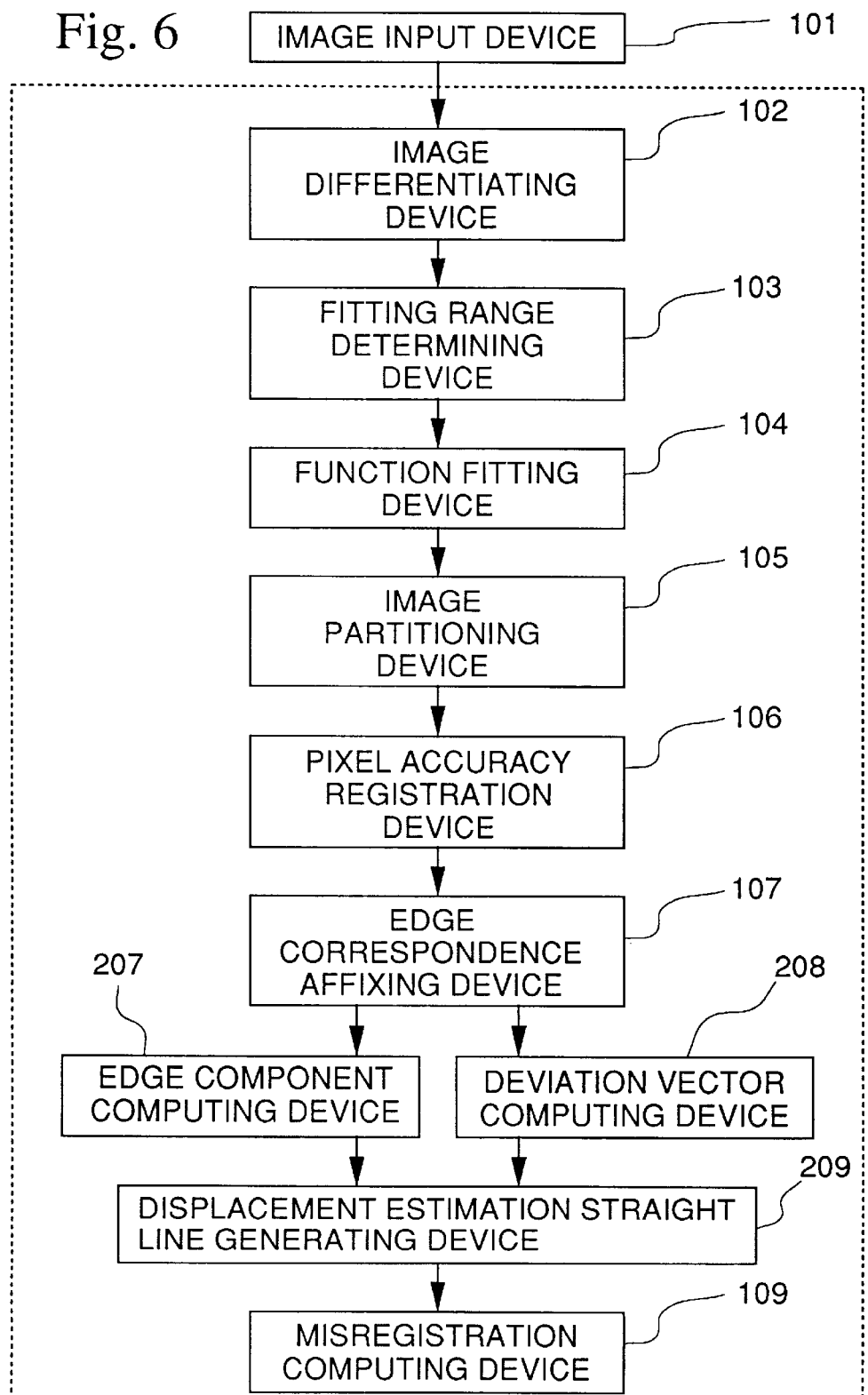
FIG. 6 is a block diagram showing the construction of an image registration apparatus of a second embodiment of the present invention.

FIG. 6 is a block diagram showing the construction of an image registration apparatus of a second embodiment of the present invention. This image registration apparatus 200 is constructed with an edge component computing device 207, a deviation vector computing device 208 and a displacement estimation straight line generating device 209, provided instead of the edge correspondence affixing device 107 and the corresponding candidate curve generating device 108 in the image registration apparatus 100 shown in FIG. 1. That is, the image registration apparatus 200 is provided with: the edge component computing device 207 for judging if there is a corresponding relationship between the edge pixels, and the deviation vector computing device 208 for computing a longitudinal deviation vector and a transverse deviation vector, which are arranged on the output side of the pixel accuracy registration device 106, and the displacement estimation straight line generating device 209 for generating a displacement estimation straight line based on, the presence of a corresponding relationship between the edge pixels, and the longitudinal deviation vector and the transverse deviation vector.

The edge component computing device 207, basically superposes the longitudinal direction edge position image and the transverse direction edge position image of the image A, and detects an edge pixel H on the transverse direction edge position image with the closest coordinate to an edge pixel G on the longitudinal direction edge position image. If the mutual distances are within a pre-assigned range, it is regarded that there is a corresponding relationship, and each are components in different directions of the same edge. If the mutual distances are not within the pre-assigned range, it is regarded that there is no corresponding relationship, and there is no component in the other direction. The edge component computing device 207 judges whether or not there is a corresponding relationship for all of the edge pixels on the longitudinal differential image and the transverse differential image.

The deviation vector computing device 208, based on the results of registration with the pixel accuracy registration device 106, detects, when the longitudinal direction edge position image and the transverse direction edge position image of the image A are moved in parallel with and superposed on the longitudinal direction edge position image and the transverse direction edge position image of the image B, if an edge pixel K with the closest distance in the up and down direction to an edge pixel J on the longitudinal direction edge position image of the image A, is over the longitudinal direction edge position image of the input image B. If the distance between the edge pixel J and the edge pixel K is less than a pre-assigned threshold value, then the vector extending from the subpixel accuracy edge position of the edge pixel J to the subpixel accuracy edge position of the edge pixel K is made the inter-image longitudinal direction misregistration vector L. The deviation vector computing device 208 repeats this operation to thereby obtain the longitudinal direction misregistration vectors for all of the edge pixels on the longitudinal direction edge position image of the image A. Moreover, the deviation vector computing device 208, for the transverse direction edge position image, searches on the transverse direction edge position image of the image B for an edge pixel Q with the closet distance in the sideways direction to a longitudinal edge pixel P on the transverse direction edge position image of the image A. If the distance between the edge pixel P and the edge pixel Q is less than a pre-assigned threshold value, then a vector extending from the subpixel accuracy edge position of the edge pixel P to the subpixel accuracy edge position of the edge pixel Q is made the inter-image transverse direction misregistration vector R, and the transverse direction misregistration vectors are obtained for all of the edge pixels on the transverse direction edge position image of the image A.

The displacement estimation straight line generating device 209, in the case where in the edge component computing device 207, it is considered that there is a corresponding relationship between the edge pixel J on the longitudinal direction edge position image and the edge pixel P on the transverse direction edge position image, plots so that the respective reference points for the longitudinal direction misregistration vector L and the transverse direction misregistration vector R are placed at the origin of the coordinates, and makes the straight line passing through the tip ends of the respective vectors the displacement estimation straight line. Furthermore, the displacement estimation straight line generating device 209, for the case where it is considered that there is no corresponding relationship between the transverse edge pixel J and the longitudinal edge pixel P, plots so that the reference point for the longitudinal direction misregistration vector L is placed at the origin of the coordinates, and makes the straight line passing through the tip ends of the longitudinal direction misregistration vector L and parallel with the x axis, being the coordinate axis in the transverse direction, the displacement estimation straight line, and at the same time, plots so that the reference point for the transverse direction misregistration vector R is placed at the origin of the coordinates, and makes the straight line passing through the tip end of the transverse direction misregistration vector R and parallel with the y axis, being the coordinate axis in the longitudinal direction, the displacement estimation straight line. The displacement estimation straight line generating device 209 in this way, obtains the displacement estimation straight line for all of the edge pixels in the longitudinal differential image and the transverse differential image.

Furthermore, with the image registration apparatus 200, the misregistration computing device 109 plots in one plane, all of the displacement estimation straight lines on the longitudinal direction edge position image and the transverse direction edge position image of the image B respectively corresponding to all of the edge pixels on the longitudinal direction edge position image and the transverse direction edge position image of the image A, and obtains at subpixel accuracy, the point where all of the displacement estimation straight lines intersect, or the point where all of the displacement estimation straight lines are most concentrated, and makes this the corresponding candidate intersection point, and computes a displacement vector connecting from the origin of the coordinate system to the corresponding candidate intersection point.

Next is a description of the operation of the image registration apparatus 200.

In the same way as for the case of the first embodiment, the apparatus first executes from input of the image A and the image B until registration at pixel accuracy by the pixel accuracy registration device 106.

Processing then transfers to the edge component computing device 207, where for the image A, the edge pixels on the longitudinal direction edge position images are made the transverse edge component pixels, and the edge pixels on the transverse direction edge position image are made the longitudinal edge component pixels. The longitudinal direction edge position image Av of the image A and the transverse direction edge position image Ah of the same image A are superimposed, and the transverse edge component pixel on the longitudinal direction edge position image Av is made the transverse edge component pixel G. With respect to this transverse edge component pixel G, the longitudinal edge component pixel closet to the coordinate on the transverse direction edge position image is detected, and this is made the longitudinal edge component pixel H. If the distance between the transverse edge component pixel G and the longitudinal edge component pixel H is within a pre-assigned range, then the transverse edge component pixel G and the longitudinal edge component pixel H are respectively regarded as being the transverse edge component and the longitudinal edge component on the same edge on the input image A, and the longitudinal edge component pixel H is corresponded with the transverse edge component pixel G. The same processing is performed with respect to all of the transverse edge component pixels on the longitudinal direction edge position image Av, and the corresponding longitudinal edge component pixels on the transverse direction edge position image Ah obtained. In the case where there is no corresponding longitudinal edge component pixel on the transverse direction edge position image Ah, then the transverse edge component pixel on that longitudinal direction edge position image Av is made the pure transverse edge pixel. Next in the case where the transverse direction edge position image Ah is made a reference, and inside the longitudinal edge component pixel on the transverse direction edge position image Ah, there is no corresponding transverse edge component pixel on the longitudinal direction edge position image Av, then this transverse edge component pixel is made the pure longitudinal edge pixel.

The processing with the deviation vector computing device 208 is carried out independent of the processing with the abovementioned edge component computing device 207. The deviation vector computing device 208, based on the results of registration with the pixel accuracy registration device 106, moves the longitudinal direction edge position image Av and the transverse direction edge position image Ah of the image A, in parallel with the longitudinal direction edge position image Bv and the transverse direction edge position image Bh of the image B, to superimpose thereon. It then makes the transverse edge component pixel on the longitudinal direction edge position image Av a transverse edge component pixel J, and searches on the input longitudinal direction edge position image Bv for the transverse edge component pixel with the closest distance in the up and down direction to the transverse edge component pixel J, and makes the found transverse edge component pixel a transverse edge component pixel K. If the distance between the transverse edge component pixel J and the transverse edge component pixel K is less than a pre-assigned threshold value, then these transverse edge component pixels are considered to correspond to each other. The vector extending from the longitudinal direction subpixel accuracy edge position of the transverse edge component pixel J to the longitudinal direction subpixel accuracy edge position of the transverse edge component pixel K is regarded as the inter-image longitudinal direction misregistration vector, and this is made the longitudinal direction misregistration vector L. The deviation vector computing device 208 repeats this processing to thereby obtain the longitudinal direction misregistration vectors for all of the transverse edge component pixels on the longitudinal direction edge position image Av. For the transverse direction edge position image, the deviation vector computing device 208 makes the longitudinal edge component pixel on the input transverse direction edge position image Ah a longitudinal edge component pixel P, and searches on the transverse direction edge position image Bh for the longitudinal edge component pixel with the closest distance in the up and down direction to the longitudinal edge component pixel P, and makes the found longitudinal edge component pixel a longitudinal edge component pixel Q. If the distance between the longitudinal edge component pixel P and the longitudinal edge component pixel Q is less than a pre-assigned threshold value, then these longitudinal edge component pixels are considered to correspond. The vector extending from the transverse direction subpixel accuracy edge position of the longitudinal edge component pixel P to the transverse direction subpixel accuracy edge position of the longitudinal edge component pixel Q is regarded as the inter-image transverse direction misregistration vector, and this is made the transverse direction misregistration vector R. This processing is repeated to thereby obtain the transverse direction misregistration vectors for all of the longitudinal edge component pixels on the transverse direction edge position image Ah.

Figure 7A:
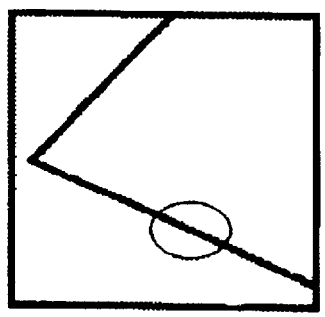
FIG. 7A is a diagram showing an image A being one example of an input image, 7B is a diagram showing an image B being one example of an input image, 7C is an enlarged diagram of the surroundings of a certain edge where a longitudinal differential image of the image A and a longitudinal differential image of the image B are superposed, with a vector drawn from the center of a certain edge pixel on the longitudinal differential image of the image A to the center of the edge pixel on the longitudinal differential image of the image B corresponding thereto, as the longitudinal direction displacement vector, 7D is an enlarged diagram of the surroundings of a certain edge where the transverse differential image of the image A and the transverse differential of the image B are superposed, with a vector drawn from the center of a certain edge pixel on the transverse differential image of the image A to the center of the edge pixel on the transverse differential image of the image B corresponding thereto, as the transverse direction displacement vector, and 7E is a diagram for explaining a displacement estimation straight line.
Figure 7B:
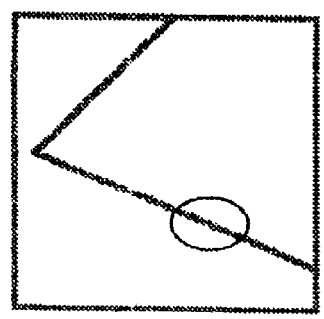
Figure 7C:
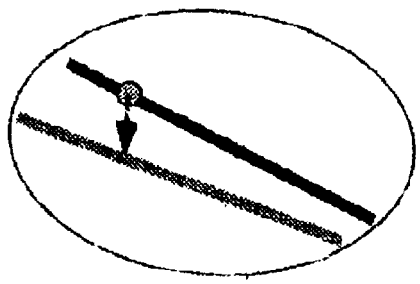

For example, in the case where the longitudinal differential image of the image A is as shown in FIG. 7A, and the longitudinal differential image of the image B is as shown in FIG. 7B, then if their edge portions are enlarged, these become as shown in FIG. 7C, and the vector extending in the up and down direction from the longitudinal direction subpixel accuracy edge position of the edge pixel of the image A to the longitudinal direction subpixel accuracy edge position of the edge pixel of the image B, is made the longitudinal direction misregistration vector. With the transverse differential images, considering these to be in the same region as the now enlarged longitudinal differential images, then this becomes as shown in FIG. 7D, and the vector extending in the sideways direction from the edge pixel of the image A to the edge pixel of the image B is made the transverse direction misregistration vector.

Once in the above manner, the judgment for the presence of a corresponding relationship between the edge pixels, and the computation of the longitudinal direction misregistration vector and the transverse direction misregistration vector is completed, the displacement estimation straight line generating device 209 generates a displacement estimation straight line. That is, the displacement estimation straight line generating device 209, in the case where there is a corresponding relationship between transverse edge pixel J on the longitudinal edge position image Av and the longitudinal edge pixel P on the transverse edge position image of the image A, plots so that the respective reference points for the longitudinal direction misregistration vector L and the transverse direction misregistration vector R are placed on the origin of the coordinates, and makes the straight line passing through the tip ends of the respective vectors the displacement estimation straight line.

On the other hand, in the case where there is no corresponding relationship between the transverse edge pixel J and the longitudinal edge pixel P, then this is plotted so that the reference point of the longitudinal direction misregistration vector L is placed on the origin of the coordinates, and the straight line passing through the tip end of the longitudinal direction misregistration vector L and parallel with the x axis, being the coordinate axis in the transverse direction, is made the displacement estimation straight line. At this time, simultaneously, this is plotted so that the reference point of the transverse direction misregistration vector R is placed at the origin of the coordinates, and the straight line passing through the tip end of the transverse direction misregistration vector R and parallel with the y axis, being the coordinate axis in the longitudinal direction, is made the displacement estimation straight line. The displacement estimation straight line generating device 209 makes the vectors extending from the origin of the coordinate system to arbitrary points on these displacement estimation straight lines, the displacement candidate vectors, and it is considered that amongst these displacement candidate vectors there is included a vector indicating the true displacement between the images. In this way, the displacement estimation straight line for all of the edge pixels in the longitudinal differential image and the transverse differential image is obtained.

Figure 7D:
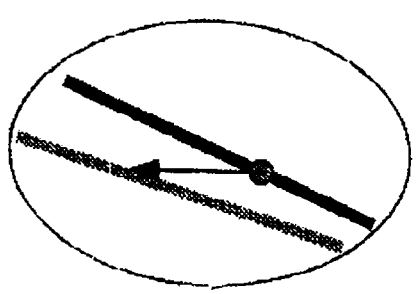
Figure 7E:
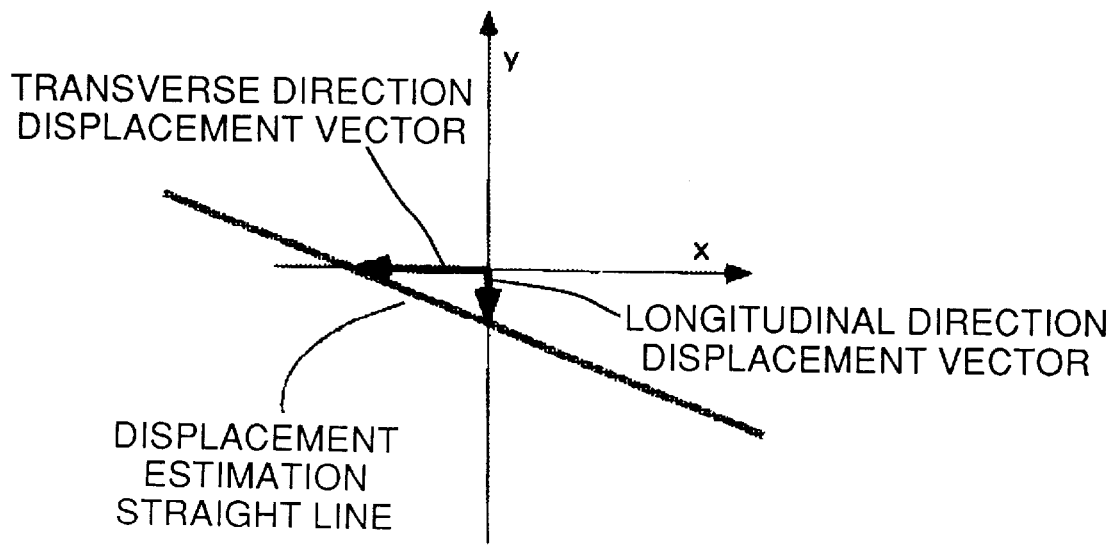

For example, in the case where the longitudinal direction misregistration vector is the one shown in FIG. 7C and the transverse direction misregistration vector is obtained as shown in FIG. 7D, then the displacement estimation straight line becomes as shown in FIG. 7E. However, with a complete transverse edge, since there is only the longitudinal direction misregistration vector, then the straight line parallel with the x axis and passing through the tip end of the vector for when the reference point of that vector is at the origin is made the displacement estimation straight line. Moreover, with a complete longitudinal edge, since there is only the transverse direction misregistration vector, then the straight line parallel with the y axis and passing through the tip end of the vector for when the reference point of that vector is at the origin is made the displacement estimation straight line.

To continue, in the misregistration computing device 109, for the displacement estimation straight line, the point where all of the displacement estimation straight lines intersect, or the point where all of the displacement estimation straight lines are most concentrated is obtained, and this is made the true inter-image subpixel accuracy displacement vector connected to the origin of the coordinate system. This processing is the processing where, in the processing in the image registration apparatus 100 shown in FIG. 1 which obtains the point where all of the corresponding candidate straight lines intersect or the point where all of the corresponding candidate straight lines are most concentrated, the displacement estimation straight line is read in place of the corresponding candidate straight line. In the final analysis, the displacement vector it is obtained by procedures similar to those performed in the image registration apparatus 100.

Third Embodiment

FIG. 8 is a block diagram showing the construction of an image registration apparatus of a third embodiment of the present invention. This image registration apparatus 300 is constructed with the function fitting device 104 in the image registration apparatus 100 shown in FIG. 1 replaced with a composite mono-peak function fitting device 304, and incorporates a composite mono-peak function storage device 303 for storing as composite mono-peak functions, functions with an added up pre-assigned number of mono-peak functions with different parameters for determining various function shapes. The composite mono-peak function fitting device 304, with the longitudinal differential image, executes for each longitudinal fitting range on the respective scanning lines in the longitudinal direction, fitting of the composite mono-peak function in the longitudinal direction, and obtains the coordinates of the maximum value point of each mono-peak function constituting the composite mono-peak function, separated into an accuracy of less than one pixel, that is a subpixel accuracy, and a pixel accuracy, and makes these a subpixel accuracy longitudinal edge position and a pixel accuracy longitudinal direction edge position. Moreover it respectively makes the pixel where the transverse direction coordinate is equal to the transverse direction coordinate of the longitudinal direction fitting range, and the pixel where longitudinal direction coordinate is equal to the pixel accuracy edge, the edge pixels, and makes the pixel values of each edge pixel the value of the subpixel accuracy longitudinal direction edge position, and generates the longitudinal direction edge position image. The composite mono-peak function fitting device 304, also for the transverse differential image, similarly obtains the subpixel accuracy transverse direction edge position and the pixel accuracy transverse direction edge position, and generates the subpixel accuracy transverse direction edge position image.

Next is a description of the operation of the image registration apparatus 300.

In the composite mono-peak function storage device 303, is previously stored as composite mono-peak functions, functions with an added up pre-assigned number of mono-peak functions with different parameters for determining various function shapes. For example, in the case where the added up functions are Gaussian, then the dispersion $\sigma$ and the peak strength $\alpha$ of each Gaussian is different.

After executing the steps from input of the image A and image B to determining the fitting range, in the same manner as for the case of the image registration apparatus shown in FIG. 1, processing moves to the composite mono-peak function fitting device 304. The composite mono-peak function fitting device 304, with the longitudinal differential image, executes for each longitudinal fitting range on the respective scanning lines in the longitudinal direction, fitting of the composite mono-peak function in the longitudinal direction, and obtains the coordinate of the maximum value point of each mono-peak function constituting the composite mono-peak function, at an accuracy of less that one pixel, that is at subpixel accuracy. These obtained edge positions are made the subpixel accuracy longitudinal direction edge position, and the positions with an accuracy less than the decimal point of the subpixel accuracy longitudinal direction edge position, where 0.5 and over is counted 1 and less than 0.5 discarded are made the pixel accuracy longitudinal direction edge positions. Then, an image with the longitudinal and transverse size of the image equal to the input image is generated, and this is made the longitudinal direction edge position image. On this longitudinal direction edge position image, the pixel where the coordinate in the transverse direction, that is the x coordinate is the x coordinate of the longitudinal direction fitting range, and the coordinate in the longitudinal direction, that is the y coordinate is the pixel accuracy longitudinal direction edge position, is regarded as the edge pixel being the element which constitutes the edge, and the pixel value of this edge pixel is made the subpixel accuracy longitudinal direction edge position. The composite mono-peak function fitting device 304, similarly, for the transverse differential image, fits the composite mono-peak function in the transverse direction for each transverse fitting range on the respective scanning lines of the transverse direction, and in the same manner as for the case of the longitudinal differential image, obtains the subpixel accuracy transverse direction edge position and the pixel accuracy transverse direction edge position, and generates the subpixel accuracy transverse direction edge position image.

In this way, once by means of the composite mono-peak function fitting device 304, the subpixel accuracy longitudinal direction edge position, the pixel accuracy longitudinal direction edge position, the subpixel accuracy transverse direction edge position, and the pixel accuracy transverse direction edge position are obtained, and the subpixel accuracy longitudinal direction edge position image and the subpixel accuracy transverse direction edge position image are generated, thereafter the processing of and subsequent to the image partitioning device 105 can be performed as with the case of the image registration apparatus 100 shown in FIG. 1. Moreover, instead of the processing of the image registration apparatus 100 shown in FIG. 1, processing the same as for the case of the image registration apparatus 200 shown in FIG. 2 can be performed.

Figure 9:
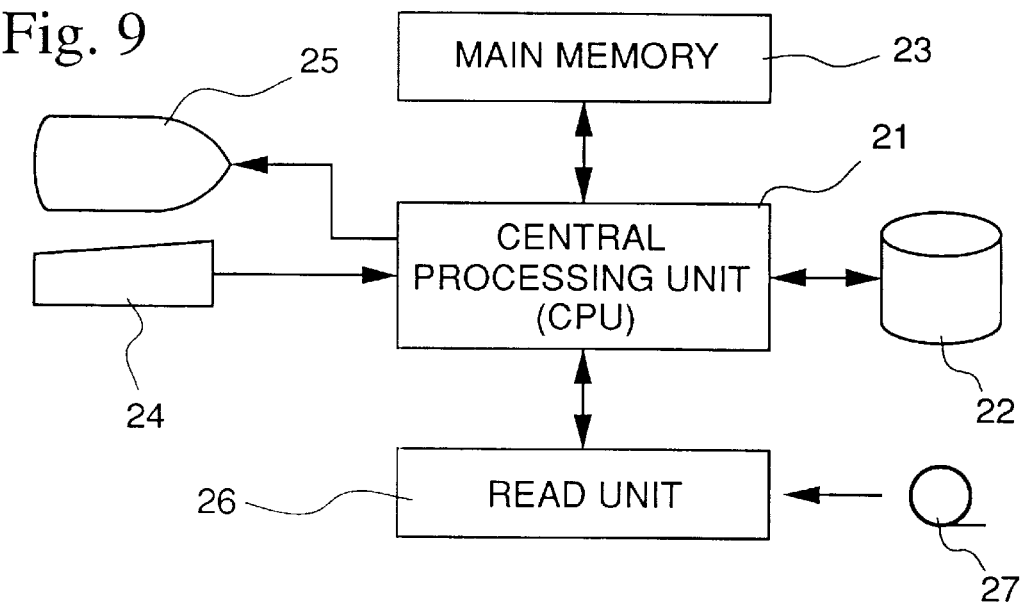
FIG. 9 is a block diagram showing an example of a computer system for realizing the image registration apparatus.
Figure 10A:
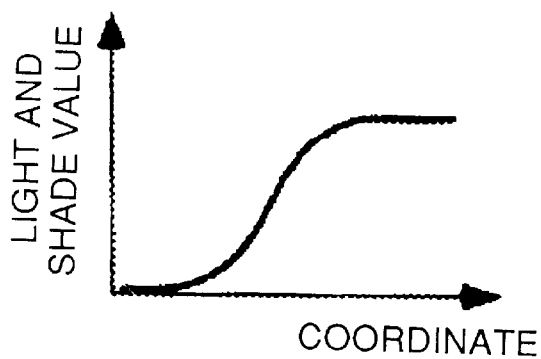
FIG. 10A is a diagram showing an example of an input image where the gray level value change of a sloping portion on the edge is comparatively gentle, 10B is a diagram showing an example of an input image where the gray level value change of a sloping portion on the edge is comparatively abrupt, and 10C is a diagram showing the results of where the input image shown in FIG. 10A and the input image shown in FIG. 10B are registered and superimposed.
Figure 10B:
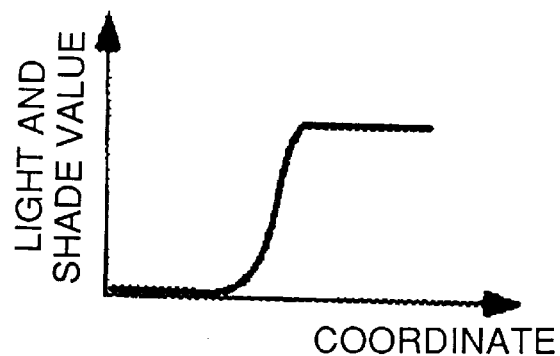
Figure 10C:
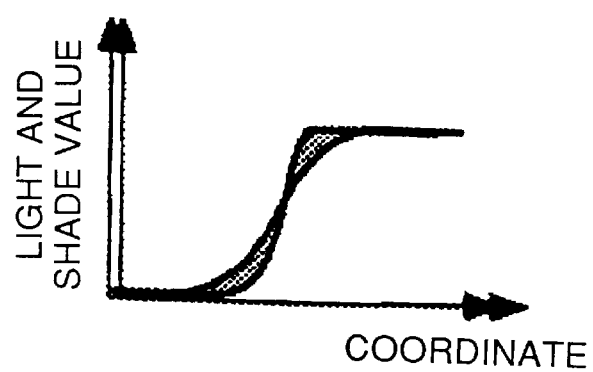
Figure 11A:
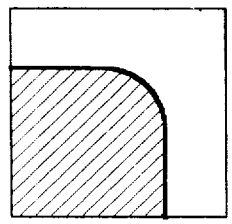
FIG. 11A is a diagram showing an example of an input image with a radius at a corner (curvature of the corner comparatively small), 11B is a diagram showing an example of an input image with no radius at the corner (curvature of the corner comparatively large), 11C is a diagram showing the results of superposing the input image shown in FIG. 11A with the input image shown in FIG. 11B so that the straight line edge portions coincide, and 11D is a diagram showing the results of superposing the input image shown in FIG. 11A with the input image shown in FIG. 11B so that the areas of the portions which are not superposed on each other are a minimum.
Figure 11B:
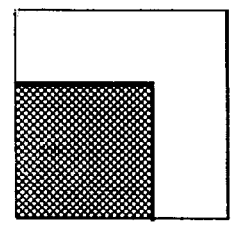
Figure 11C:
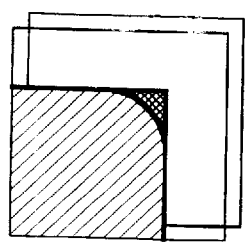
Figure 11D:
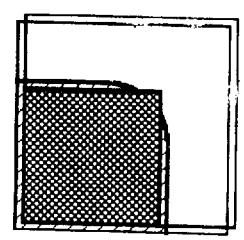
Figure 12A:
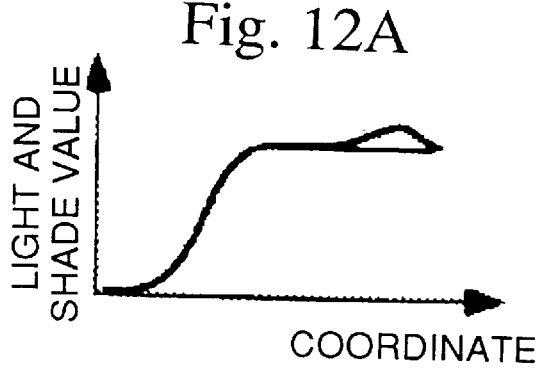
FIG. 12A is a diagram showing an example of an input image with a texture on the pattern, 12B is a diagram showing an example of an input image with a texture on the pattern with the texture slightly towards the edge compared to the input image of FIG. 12A, 12C is a diagram showing the results of superposing the input image shown in FIG. 12A on the input image shown in FIG. 12B so that edge portions coincide, and 12D) is a diagram showing the results of superposing the input image shown in FIG. 12A on the input image shown in FIG. 12B so that the textures on the patterns coincide.
Figure 12B:
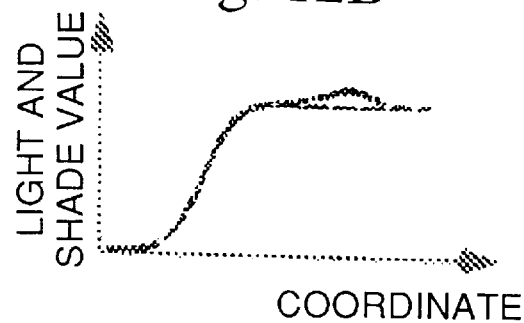
Figure 12C:
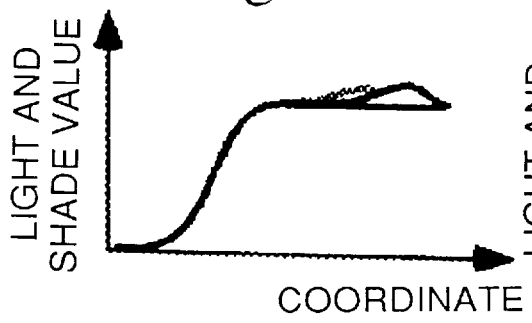
Figure 12D:
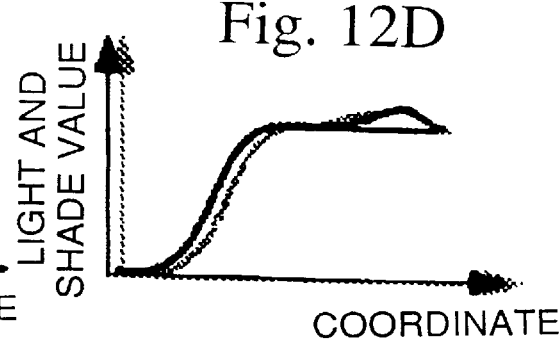
Figure 13A:
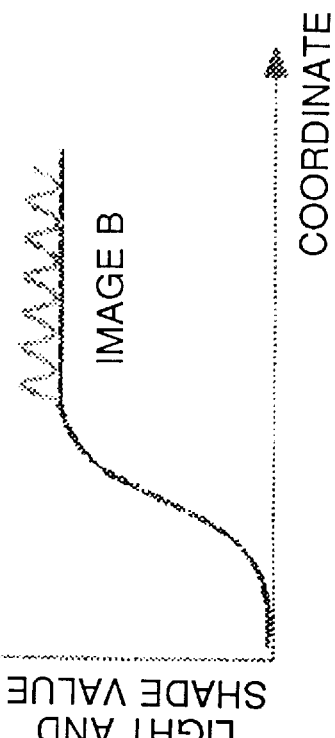
FIG. 13A is a diagram showing an example of an input image with a texture due to a fine periodic noise on the pattern, 13B is a diagram showing an example of an input image with a texture due to a slight periodic noise on the pattern, where the phase of the periodic noise compared to the input image of FIG. 13A is shifted slightly towards the edge, 13C is a diagram showing the results of superposing the input image shown in FIG. 13A on the input image shown in FIG. 13B so that the edge portions coincide, and 13D is a diagram showing the results of superposing the input image shown in FIG. 13A on the input image shown in FIG. 13B so that the textures due to the slight periodic noise on the patterns coincide.
Figure 13B:
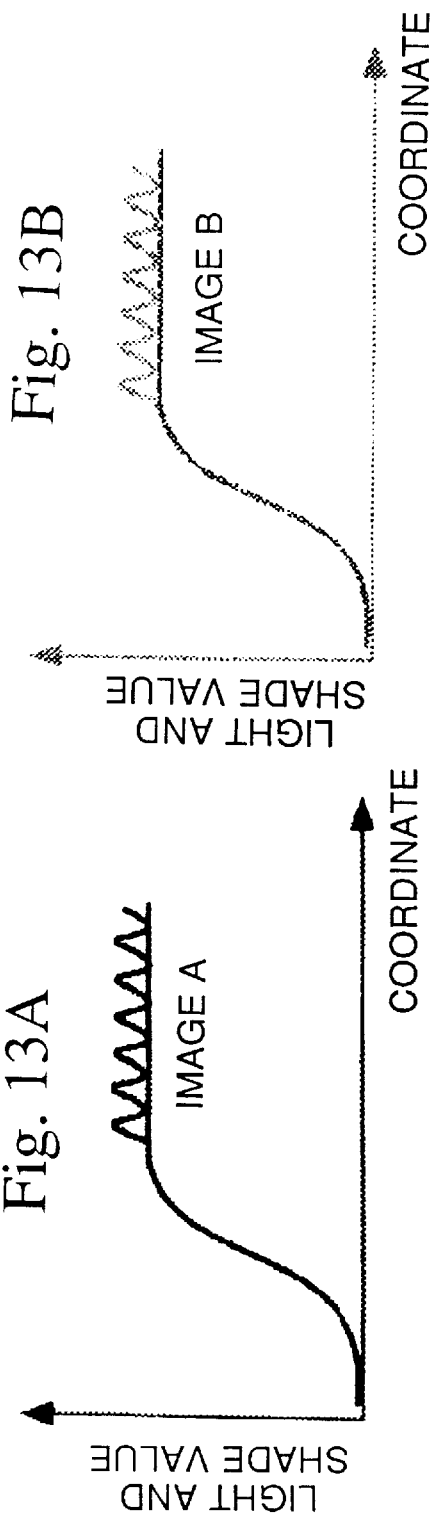
Figure 13C:
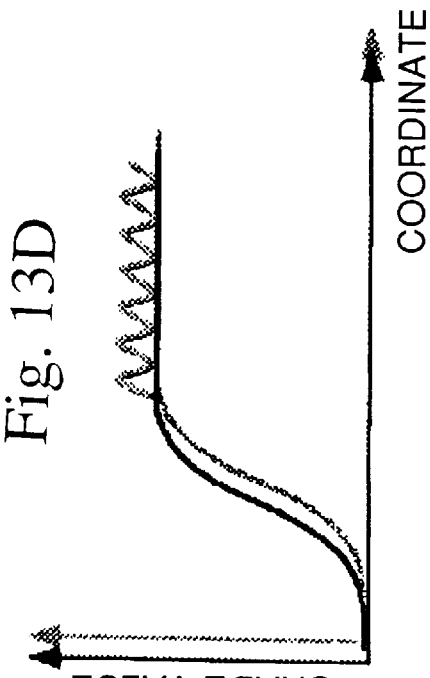
Figure 13D:
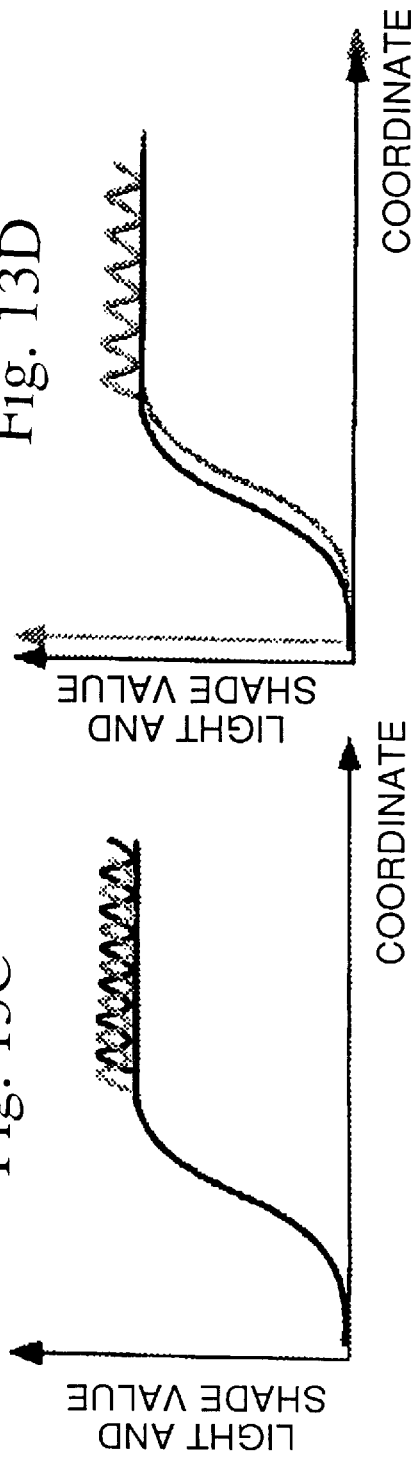

In the above, preferred embodiments of the present invention have been described. However the image registration apparatus of the respective embodiments can also be realized by reading in a computer program which can realize these image registration apparatus, into a computer such as a super computer or an engineering work station (EWS), and then executing the program. FIG. 9 is a block diagram showing the construction of a computer for realizing by means of software, the image registration apparatus of the abovementioned respective embodiments.

This computer comprises a central processing unit (CPU) 21, a hard disc unit 22 for storing programs and data, a main memory 23, an input device 24 such as a keyboard and mouse, a display device 25 such as a CRT, and a read unit 26 for reading a recording medium 27 such as a magnetic disc or CD-ROM. The hard disc unit 22, the main memory 23, the input device 24, the display device 25 and the read unit 26 are all connected to the central processing unit 21. With this computer, the recording medium 27 on which is stored the program for making the computer function as an image registration apparatus, is installed in the read unit 26. The program is then read out from the recording medium 27 and stored on the hard disc unit 22. The central processing unit 21 then executes the program stored on the hard disc unit 22, to thereby execute processing for the abovementioned image registration. The input images (image A and image B) which are the to be registered, may be stored beforehand in the hard disc unit 22 as an image file.

With the present invention as described above, the edge position of the pattern on the image which is not easily influenced by differences in edge profiles between images, or subtle textures, is obtained at subpixel accuracy by function fitting. Then based on this edge position, the distance between the corresponding edges of the images to be registered is obtained at subpixel accuracy. There is thus the effect that misregistration between images can be obtained at subpixel accuracy. As a result, even if the image pair to be registered differ due to deformation or noise, registration can be effected at subpixel accuracy. In particular, in the case where there is noise in a fine mesh pattern (textural form) on the image, then compared to the conventional technique, the accuracy of registration is less readily affected.

What is claimed is:

1. A method of registering images which detects relative misregistration between an input first image and second image, said method comprises the steps of:

performing differentiation for each of said images, in a longitudinal direction and a transverse direction of each image, and generating a longitudinal differential image having absolute values of longitudinal differential values as pixel values, and a transverse differential image having absolute values of transverse differential values as pixel values;

generating a complete differential image from said longitudinal differential image and said transverse differential image;

obtaining longitudinal direction fitting ranges for said longitudinal differential image by scanning the pixel values in the longitudinal direction;

obtaining transverse direction fitting ranges for said transverse differential image by scanning the pixel values in the transverse direction; and for each of said longitudinal fitting ranges on said longitudinal differential image, fitting a mono-peak function in the longitudinal direction;, and obtaining a coordinate of the maximum value point separated into subpixel accuracy being an accuracy of less than one pixel, and pixel accuracy, and making this the respective subpixel accuracy longitudinal direction edge position and the pixel accuracy longitudinal direction edge position, and with the pixel corresponding to said pixel accuracy longitudinal direction edge position as the edge pixel, generating a longitudinal direction edge position image having said subpixel accuracy longitudinal direction edge position as the pixel value of this edge pixel; and for each of said transverse fitting ranges on said transverse differential image, fitting a mono-peak function in the transverse direction, and obtaining the coordinate of the maximum value point separated into subpixel accuracy being an accuracy of less than one pixel, and pixel accuracy, and making this the respective subpixel accuracy transverse direction edge position and the pixel accuracy transverse direction edge position, and with the pixel corresponding to said pixel accuracy transverse direction edge position as the edge pixel, generating a transverse direction edge position image having said subpixel accuracy transverse direction edge position as the pixel value of this edge pixel; then generating a longitudinal differential image, a transverse differential image, a complete differential image, a longitudinal direction edge position image, and a transverse direction edge position image, respectively corresponding to images of the longitudinal differential image, the transverse differential image, the complete differential image, the longitudinal direction edge position image, and the transverse direction edge position image, which have been to pre-assigned sizes; then for each of said complete differential images, performing registration at an accuracy of one pixel by template matching, of the complete differential image of said first image with respect to the complete differential image of said second image, and in accordance with the result of this registration, registering at an accuracy of one pixel the longitudinal differential image, the transverse differential image, the longitudinal direction edge position image, and the transverse direction edge position image of said first image, with respect to the longitudinal differential image, the transverse differential image, the longitudinal direction edge position image, and the transverse direction edge position image of the second image; and when the longitudinal direction edge position image of said first image is superimposed on the longitudinal direction edge position image of said second image in accordance with the results of said registration at an accuracy of one pixel, making the pixels of the longitudinal direction edge position image of said second image which come into register with the respective edge pixels on the first longitudinal direction edge position image, reference edge pixels, and using said subpixel accuracy longitudinal direction edge position image to obtain a distance between edge pixels, and based on said distance, obtaining the corresponding candidate edge pixel group corresponding to said reference edge pixel, and repeatedly computing in said corresponding candidate edge pixel group, to obtain said corresponding candidate edge pixel group with respect to all of the edge pixels on said longitudinal direction edge position image;

and when the transverse direction edge position image of said first image is superimposed on the transverse direction edge position image of said second image in accordance with the results of said registration at an accuracy of one pixel, making the pixels of the transverse direction edge position image of said second image which come into register with the respective edge pixels on the first transverse direction edge position image, reference edge pixels, and then using said subpixel accuracy transverse direction edge position image to obtain the distance between edge pixels, and based on said distance, obtaining the corresponding candidate edge pixel group corresponding to said reference edge pixel, and repeatedly computing in said corresponding candidate edge pixel group, to obtain said corresponding candidate edge pixel group with respect to all of the edge pixels on said transverse direction edge position image;

fitting the subpixel accuracy edge positions of the respective edge pixels of said corresponding candidate edge pixel group with a curve described by a pre-assigned function shape and making this the corresponding candidate curve, and performing coordinate conversion so that the subpixel accuracy edge position of said reference edge pixel becomes the origin, and making said corresponding candidate curve in this coordinate system a relative corresponding candidate curve, and obtaining relative corresponding candidate curves for all of said longitudinal direction edge position images and said transverse direction edge position image; and for all of the edge pixels of said first image, plotting in one plane the respectively corresponding relative corresponding candidate curves of said second image, and obtaining at subpixel accuracy a point- where all of the relative corresponding candidate curves intersect, or a point where all of the relative corresponding candidate curves are most concentrated, and making this a corresponding candidate intersection point, and then computing a displacement vector being a vector connecting from the origin of the coordinate system of the plotted plane to said corresponding candidate intersection point.

2. A method of registering images which detects relative misregistration between an input first image and second image, said method comprises the steps of:

performing differentiation for each of said images, in a longitudinal direction and a transverse direction of each image, and generating a longitudinal differential image having absolute values of longitudinal differential values as pixel values, and a transverse differential image having absolute values of transverse differential values as pixel values;

generating a complete differential image from said longitudinal differential image and said transverse differential image;

obtaining longitudinal direction fitting ranges for said longitudinal differential image by scanning the pixel values in the longitudinal direction;

obtaining transverse direction fitting ranges for said transverse differential image by scanning the pixel values in the transverse direction; and for each of said longitudinal fitting ranges on said longitudinal differential image, fitting a mono-peak function in the longitudinal direction, and obtaining the coordinate of the maximum value point separated into subpixel accuracy being an accuracy of less than one pixel, and pixel accuracy, and making this the respective subpixel accuracy longitudinal direction edge position and the pixel accuracy longitudinal direction edge position, and with the pixel corresponding to said pixel accuracy longitudinal direction edge position as the edge pixel, generating a longitudinal direction edge position image having said subpixel accuracy longitudinal direction edge position as the pixel value of this edge pixel; and for each of said transverse fitting ranges on said transverse differential image, fitting a mono-peak function in the transverse direction, and obtaining a coordinate of the maximum value point separated into subpixel accuracy being an accuracy of less than one pixel, and pixel accuracy, and making this the respective subpixel accuracy transverse direction edge position and the pixel accuracy transverse direction edge position, and with the pixel corresponding to said pixel accuracy transverse direction edge position as the edge pixel, generating a transverse direction edge position image having said subpixel accuracy transverse direction edge position as the pixel value of this edge pixel, then generating a longitudinal differential image, a transverse differential image, a complete differential image, a longitudinal direction edge position image, and a transverse direction edge position image, respectively corresponding to images of the longitudinal differential image, the transverse differential image, the complete differential image, the longitudinal direction edge position image, and the transverse direction edge position image, which have been to pre-assigned sizes, then for each of said complete differential images, performing registration at an accuracy of one pixel by template matching, of the complete differential image of said first image with respect to the complete differential image of said second image, and in accordance with the result of this registration, registering at an accuracy of one pixel the longitudinal differential image, the transverse differential image, the longitudinal direction edge position image, and the transverse direction edge position image of said first image, with respect to the longitudinal differential image, the transverse differential image, the longitudinal direction edge position image, and the transverse direction edge position image of said second image, then superposing the longitudinal direction edge position image on the transverse direction edge position image of said first image, detecting an edge pixel on the transverse direction edge position image with the closest coordinate to an edge pixel on the longitudinal direction edge position image and computing the mutual distance, to thereby judge for the presence of a corresponding relationship between edge pixels, and when the longitudinal direction edge position image and the transverse direction edge position image of said first image are moved in parallel with the longitudinal direction edge position image and the transverse direction edge position image of said second image and superposed based on the results of said registration at an accuracy of one pixel, detecting the edge pixel with a closest distance in the up and down direction to the edge pixel on the longitudinal direction edge position image of said first image on the longitudinal direction edge position image of said second image, and when a distance between the two edge pixels is less than a pre-assigned threshold value, making the vector which connects the subpixel accuracy edge position of said two edge pixels a longitudinal direction misregistration vector, and obtaining said longitudinal direction misregistration vectors for all of the edge pixels on the longitudinal direction edge position image of said first image, and furthermore detecting the edge pixel with the closest distance in a sideways direction to the edge pixel on the transverse direction edge position image of said first image on the transverse direction edge position image of said second image, and when the distance between the two edge pixels is less than a pre-assigned threshold value, making the vector which connects the subpixel accuracy edge position of said two edge pixels a transverse direction misregistration vector, and obtaining said transverse direction misregistration vectors for all of the edge pixels on the transverse direction edge position image of said first image, and in the case where it is considered that there is a corresponding relationship between an edge pixel on said longitudinal direction edge position image and an edge pixel on said transverse direction edge position image, plotting so respective reference points of said longitudinal direction misregistration vector and said transverse direction misregistration vector are placed at the origin of the coordinates, and making a straight line passing through tip ends of said respective vectors a displacement estimation straight line, and in the case where it is considered that there is no corresponding relationship between an edge pixel on said longitudinal direction edge position image and an edge pixel on said transverse direction edge position image, plotting so that a reference point of said longitudinal direction misregistration vector is placed at the origin of the coordinates, and making a straight line passing through the tip end of said longitudinal direction misregistration vector and parallel with the coordinate axis in the transverse direction a displacement estimation straight line, and at the same time plotting so that so that a reference point of the transverse direction misregistration vector is placed at the origin of the coordinates, and making a straight line passing through the tip end of the transverse direction misregistration vector and parallel with the coordinate axis in the longitudinal direction a displacement estimation straight line, and obtaining the displacement estimation straight lines for all of the edge pixels in said longitudinal differential image and said transverse differential image, and for all of the edge pixels of said first image, plotting in one plane the respectively corresponding displacement estimation straight lines of said second image, and obtaining at subpixel accuracy a point where all of said displacement estimation straight lines intersect, or a point where all of said displacement estimation straight lines are most concentrated, and making this a corresponding candidate intersection point, and then computing a displacement vector being a vector connecting from the origin of the coordinate system of the plotted plane to said corresponding candidate intersection point.

3. A method of registering images which detects relative misregistration between an input first image and second image, said method involving:

performing differentiation for each of said images, in a longitudinal direction and a transverse direction of each image, and generating a longitudinal differential image having absolute values of longitudinal differential values as pixel values, and a transverse differential image having absolute values of transverse differential values as pixel values, generating a complete differential image from said longitudinal differential image and said transverse differential image, obtaining longitudinal direction fitting ranges for said longitudinal differential image by scanning the pixel values in the longitudinal direction, obtaining transverse direction fitting ranges for said transverse differential image by scanning the pixel values in the transverse direction, making a function with an added up pre-assigned number of mono-peak functions with different parameters for determining various function shapes, a composite mono-peak function, and for each of said longitudinal fitting ranges on said longitudinal differential image, fitting said composite mono-peak function in the longitudinal direction, and obtaining a coordinate of the maximum value of the respective mono-peak functions constituting said composite mono-peak function separated into subpixel accuracy being an accuracy of less than one pixel, and pixel accuracy, and making this the respective subpixel accuracy longitudinal direction edge position and the pixel accuracy longitudinal direction edge position, and with the pixel corresponding to said pixel accuracy longitudinal direction edge position as the edge pixel, generating a longitudinal direction edge position image having said subpixel accuracy longitudinal direction edge position as the pixel value of this edge pixel, and for each of said transverse fitting ranges on said transverse differential image, fitting said composite mono-peak function in the transverse direction, and obtaining the coordinate of the maximum value of the respective mono-peak functions constituting said composite mono-peak function separated into subpixel accuracy being an accuracy of less than one pixel, and pixel accuracy, and making this the respective subpixel accuracy transverse direction edge position and the pixel accuracy transverse direction edge position, and with the pixel corresponding to said pixel accuracy transverse direction edge position as the edge pixel, generating a transverse direction edge position image having said subpixel accuracy transverse direction edge position as the pixel value of this edge pixel, then generating a longitudinal differential image, a transverse differential image, a complete differential image, a longitudinal direction edge position image, and a transverse direction edge position image, respectively corresponding to images of the longitudinal differential image, the transverse differential image, the complete differential image, the longitudinal direction edge position image, and the transverse direction edge position image, which have been to pre-assigned sizes, then for each of said complete differential images, performing registration at an accuracy of one pixel by template matching, of the complete differential image of said first image with respect to the complete differential image of said second image, and in accordance with the result of this registration, registering at an accuracy of one pixel the longitudinal differential image, the transverse differential image, the longitudinal direction edge position image, and the transverse direction edge position image of said first image, with respect to the longitudinal differential image, the transverse differential image, the longitudinal direction edge position image, and the transverse direction edge position image of said second image, and when the longitudinal direction edge position image of said first image is superimposed on the longitudinal direction edge position image of said second image in accordance with the results of said registration at an accuracy of one pixel, making the pixels of the longitudinal direction edge position image of said second image which come into register with the respective edge pixels on the first longitudinal direction edge position image, reference edge pixels, and using said subpixel accuracy longitudinal direction edge position image to obtain a distance between edge pixels, and based on said distance, obtaining the corresponding candidate edge pixel group corresponding to said reference edge pixel, and repeatedly computing in said corresponding candidate edge pixel group, to obtain said corresponding candidate edge pixel group with respect to all of the edge pixels on said longitudinal direction edge position image, and when the transverse direction edge position image of said first image is superimposed on the transverse direction edge position image of said second image in accordance with the results of said registration at an accuracy of one pixel, making the pixels of the transverse direction edge position image of said second image which come into register with the respective edge pixels on the first transverse direction edge position image, reference edge pixels, and then using said subpixel accuracy transverse direction edge position image to obtain the distance between edge pixels, and based on said distance, obtaining the corresponding candidate edge pixel group corresponding to said reference edge pixel, and repeatedly computing in said corresponding candidate edge pixel group, to obtain said corresponding candidate edge pixel group with respect to all of the edge pixels on said transverse direction edge position image, then fitting the subpixel accuracy edge positions of the respective edge pixels of said corresponding candidate edge pixel group with a curve described by a pre-assigned function shape and making this the corresponding candidate curve, and performing coordinate conversion so that the subpixel accuracy edge position of said reference edge pixel becomes the origin, and making said corresponding candidate curve in this coordinate system a relative corresponding candidate curve, and obtaining relative corresponding candidate curves for all of said longitudinal direction edge position images and said transverse direction edge position images, and for all of the edge pixels of said first image, plotting in one plane the respectively corresponding relative corresponding candidate curves of said second image, and obtaining at subpixel accuracy a point where all of the relative corresponding candidate curves intersect, or a point where all of the relative corresponding candidate curves are most concentrated, and making this a corresponding candidate intersection point, and then computing a displacement vector being a vector connecting from the origin of the coordinate system of the plotted plane to said corresponding candidate intersection point.

4. An apparatus for registering images, which detects relative misregistration between an input first image and second image, said apparatus having:

image differentiating means for performing differentiation for each of said images, in a longitudinal direction and a transverse direction of each image, and generating a longitudinal differential image having absolute values of longitudinal differential values as pixel values, and a transverse differential image having absolute values of transverse differential values as pixel values, and generating a complete differential image from said longitudinal differential image and said transverse differential image, fitting range setting means for obtaining longitudinal direction fitting ranges for said longitudinal differential image by scanning the pixel values in the longitudinal direction, and obtaining transverse direction fitting ranges for said transverse differential image by scanning the pixel values in the transverse direction, function fitting means for fitting for each of said longitudinal fitting ranges on said longitudinal differential image, a mono-peak function in the longitudinal direction, and obtaining a coordinate of the maximum value point separated into subpixel accuracy being an accuracy of less than one pixel, and pixel accuracy, and making this the respective subpixel accuracy longitudinal direction edge position and the pixel accuracy longitudinal direction edge position, and with the pixel corresponding to said pixel accuracy longitudinal direction edge position as the edge pixel, generating a longitudinal direction edge position image having said subpixel accuracy longitudinal direction edge position as the pixel value of this edge pixel, and for each of said transverse fitting ranges on said transverse differential image, fitting a mono-peak function in the transverse direction, and obtaining the coordinate of the maximum value point separated into subpixel accuracy being an accuracy of less than one pixel, and pixel accuracy, and making this the respective subpixel accuracy transverse direction edge position and the pixel accuracy transverse direction edge position, and with the pixel corresponding to said pixel accuracy transverse direction edge position as the edge pixel, generating a transverse direction edge position image having said subpixel accuracy transverse direction edge position as the pixel value of this edge pixel, image partitioning means for generating a longitudinal differential image, a transverse differential image, a complete differential image, a longitudinal direction edge position image, and a transverse direction edge position image, respectively corresponding to images of the longitudinal differential image, the transverse differential image, the complete differential image, the longitudinal direction edge position image, and the transverse direction edge position image, which have been to pre-assigned sizes, pixel accuracy registration means for performing registration, for each of said complete differential images at an accuracy of one pixel by template matching, of the complete differential image of said first image with respect to the complete differential image of said second image, and in accordance with the result of this registration, registering at an accuracy of one pixel the longitudinal differential image, the transverse differential image, the longitudinal direction edge position image, and the transverse direction edge position image of said first image, with respect to the longitudinal differential image, the transverse differential image, the longitudinal direction edge position image, and the transverse direction edge position image of said second image, edge correspondence affixing means for making, when the longitudinal direction edge position image of said first image is superimposed on the longitudinal direction edge position image of said second image in accordance with the results of registration by said pixel accuracy registration means, the pixels of the longitudinal direction edge position image of said second image which come into register with the respective edge pixels on the first longitudinal direction edge position image, reference edge pixels, and using said subpixel accuracy longitudinal direction edge position image to obtain a distance between edge pixels, and based on said distance, obtaining the corresponding candidate edge pixel group corresponding to said reference edge pixel, and repeatedly computing in said corresponding candidate edge pixel group, to obtain said corresponding candidate edge pixel group with respect to all of the edge pixels on said longitudinal direction edge position image, and when the transverse direction edge position image of said first image is superimposed on the transverse direction edge position image of said second image in accordance with the results of registration by said pixel accuracy registration means, making the pixels of the transverse direction edge position image of said second image which come into register with the respective edge pixels on the first transverse direction edge position image, reference edge pixels, and then using said subpixel accuracy transverse direction edge position image to obtain the distance between edge pixels, and based on said distance, obtaining the corresponding candidate edge pixel group corresponding to said reference edge pixel, and repeatedly computing in said corresponding candidate edge pixel group, to obtain said corresponding candidate edge pixel group with respect to all of the edge pixels on said transverse direction edge position image, corresponding candidate curve generating means for fitting the subpixel accuracy edge positions of the respective edge pixels of said corresponding candidate edge pixel group with a curve described by a pre-assigned function shape and making this the corresponding candidate curve, and performing coordinate conversion so that the subpixel accuracy edge position of said reference edge pixel becomes the origin, and making said corresponding candidate curve in this coordinate system a relative corresponding candidate curve, and obtaining relative corresponding candidate curves for all of said longitudinal direction edge position images and said transverse direction edge position images, and misregistration computing means for plotting in one plane for all of the edge pixels of said first image, the respectively corresponding relative corresponding candidate curves of said second image, and obtaining at subpixel accuracy a point where all of the relative corresponding candidate curves intersect, or a point where all of the relative corresponding candidate curves are most concentrated, and making this a corresponding candidate intersection point, and then computing a displacement vector being a vector connecting from the origin of the coordinate system of the plotted plane to said corresponding candidate intersection point.

5. An apparatus for registering images, which detects relative misregistration between an input first image and second image, said apparatus having:

image differentiating means for performing differentiation for each of said images, in a longitudinal direction and a transverse direction of each image, and generating a longitudinal differential image having absolute values of longitudinal differential values as pixel values, and a transverse differential image having absolute values of transverse differential values as pixel values, and generating a complete differential image from said longitudinal differential image and said transverse differential image, fitting range setting means for obtaining longitudinal direction fitting ranges for said longitudinal differential image by scanning the pixel values in the longitudinal direction, and obtaining transverse direction fitting ranges for said transverse differential image by scanning the pixel values in the transverse direction, function fitting means for fitting for each of said longitudinal fitting ranges on said longitudinal differential image, a mono-peak function in the longitudinal direction, and obtaining a coordinate of the maximum value point separated into subpixel accuracy being an accuracy of less than one pixel, and pixel accuracy, and making this the respective subpixel accuracy longitudinal direction edge position and the pixel accuracy longitudinal direction edge position, and with the pixel corresponding to said pixel accuracy longitudinal direction edge position as the edge pixel, generating a longitudinal direction edge position image having said subpixel accuracy longitudinal direction edge position as the pixel value of this edge pixel, and for each of said transverse fitting ranges on said transverse differential image, fitting a mono-peak function in the transverse direction, and obtaining the coordinate of the maximum value point separated into subpixel accuracy being an accuracy of less than one pixel, and pixel accuracy, and making this the respective subpixel accuracy transverse direction edge position and the pixel accuracy transverse direction edge position, and with the pixel corresponding to said pixel accuracy transverse direction edge position as the edge pixel, generating a transverse direction edge position image having said subpixel accuracy transverse direction edge position as the pixel value of this edge pixel, image partitioning means for generating a longitudinal differential image, a transverse differential image, a complete differential image, a longitudinal direction edge position image, and a transverse direction edge position image, respectively corresponding to images of the longitudinal differential image, the transverse differential image, the complete differential image, the longitudinal direction edge position image, and the transverse direction edge position image, which have been to pre-assigned sizes, pixel accuracy registration means for performing registration, for each of said complete differential images, at an accuracy of one pixel by template matching, of the complete differential image of said first image with respect to the complete differential image of said second image, and in accordance with the result of this registration, registering at an accuracy of one pixel the longitudinal differential image, the transverse differential image, the longitudinal direction edge position image, and the transverse direction edge position image of said first image, with respect to the longitudinal differential image, the transverse differential image, the longitudinal direction edge position image, and the transverse direction edge position image of said second image, edge component computing means for superposing the longitudinal direction edge position image on the transverse direction edge position image of said first image, detecting an edge pixel on the transverse direction edge position image with the closest coordinate to an edge pixel on the longitudinal direction edge position image and computing a mutual distance, to thereby judge for the presence of a corresponding relationship between edge pixels, deviation vector computing means for detecting, when the longitudinal direction edge position image and the transverse direction edge position image of said first image are moved in parallel with the longitudinal direction edge position image and the transverse direction edge position image of said second image and superposed based on the results of registration by said pixel accuracy registration means, the edge pixel with the closest distance in an up and down direction to the edge pixel on the longitudinal direction edge position image of said first image on the longitudinal direction edge position image of said second image, and when the distance between the two edge pixels is less than a pre-assigned threshold value, and making the vector which connects the subpixel accuracy edge position of said two edge pixels a longitudinal direction misregistration vector, and obtaining said longitudinal direction misregistration vectors for all of the edge pixels on the longitudinal direction edge position image of said first image, and furthermore detecting the edge pixel with the closest distance in the sideways direction to the edge pixel on the transverse direction edge position image of said first image on the transverse direction edge position image of said second image, and when the distance between the two edge pixels is less than a pre-assigned threshold value, making the vector which connects the subpixel accuracy edge position of said two edge pixels a transverse direction misregistration vector, and obtaining said transverse direction misregistration vectors for all of the edge pixels on the transverse direction edge position image of said first image, displacement estimation straight line generating means for plotting in the case where it is considered in said edge component computing means that there is a corresponding relationship between an edge pixel on said longitudinal direction edge position image and an edge pixel on said transverse direction edge position image, so that respective reference points of said longitudinal direction misregistration vector and said transverse direction misregistration vector are placed at the origin of the coordinates, and making a straight line passing through the tip ends of said respective vectors a displacement estimation straight line, and in the case where it is considered in said edge component computing means that there is no corresponding relationship between an edge pixel on said longitudinal direction edge position image and an edge pixel on said transverse direction edge position image, plotting so that a reference point of said longitudinal direction misregistration vector is placed at the origin of the coordinates, and making a straight line passing through the tip end of said longitudinal direction misregistration vector and parallel with the coordinate axis in the transverse direction a displacement estimation straight line, and at the same time plotting so that so that a reference point of the transverse direction misregistration vector is placed at the origin of the coordinates, and making a straight line passing through the tip end of the transverse direction misregistration vector and parallel with the coordinate axis in the longitudinal direction a displacement estimation straight line, and obtaining the displacement estimation straight lines for all of the edge pixels in said longitudinal differential image and said transverse differential image, and misregistration computing means for plotting in one plane for all of the edge pixels of said first image, the respectively corresponding displacement estimation straight line of said second image, and obtaining at subpixel accuracy a point where all of said displacement estimation straight lines intersect, or a point where all of said displacement estimation straight lines are most concentrated, and making this a corresponding candidate intersection point, and then computing a displacement vector being a vector connecting from the origin of the coordinate system of the plotted plane to said corresponding candidate intersection point.

6. An apparatus for registering images, which detects relative misregistration between an input first image and second image, said apparatus having:

image differentiating means for performing differentiation for each of said images, in a longitudinal direction and a transverse direction of each image, and generating a longitudinal differential image having absolute values of longitudinal differential values as pixel values, and a transverse differential image having absolute values of transverse differential values as pixel values, and generating a complete differential image from said longitudinal differential image and said transverse differential image, fitting range setting means for obtaining longitudinal direction fitting ranges for said longitudinal differential image by scanning the pixel values in the longitudinal direction, and obtaining transverse direction fitting ranges for said transverse differential image by scanning the pixel values in the transverse direction, composite mono-peak function means for making a function with an added up pre-assigned number of mono-peak functions with different parameters for determining various function shapes, a composite mono-peak function, and storing said composite mono-peak function composite mono-peak function fitting means for fitting for each of said longitudinal fitting ranges on said longitudinal differential image, said composite mono-peak function in the longitudinal direction, and obtaining a coordinate of the maximum value of the respective mono-peak functions constituting said composite mono-peak function separated into subpixel accuracy being an accuracy of less than one pixel, and pixel accuracy, and making this the respective subpixel accuracy longitudinal direction edge position and the pixel accuracy longitudinal direction edge position, and with the pixel corresponding to said pixel accuracy longitudinal direction edge position as the edge pixel, generating a longitudinal direction edge position image having said subpixel accuracy longitudinal direction edge position as the pixel value of this edge pixel, and for each of said transverse fitting ranges on said transverse differential image, fitting said composite mono-peak function in the transverse direction, and obtaining the coordinate of the maximum value of the respective mono-peak functions constituting said composite mono-peak function separated into subpixel accuracy being an accuracy of less than one pixel, and pixel accuracy, and making this the respective subpixel accuracy transverse direction edge position and the pixel accuracy transverse direction edge position, and with the pixel corresponding to said pixel accuracy transverse direction edge position as the edge pixel, generating a transverse direction edge position image having said subpixel accuracy transverse direction edge position as the pixel value of this edge pixel, image partitioning means for generating a longitudinal differential image, a transverse differential image, a complete differential image, a longitudinal direction edge position image, and a transverse direction edge position image, respectively corresponding to images of the longitudinal differential image, the transverse differential image, the complete differential image, the longitudinal direction edge position image, and the transverse direction edge position image, which have been to pre-assigned sizes, pixel accuracy registration means for performing registration, for each of said complete differential images, at an accuracy of one pixel by template matching, of the complete differential image of said first image with respect to the complete differential image of said second image, and in accordance with the result of this registration, registering at an accuracy of one pixel the longitudinal differential image, the transverse differential image, the longitudinal direction edge position image, and the transverse direction edge position image of said first image, with respect to the longitudinal differential image, the transverse differential image, the longitudinal direction edge position image, and the transverse direction edge position image of said second image, edge correspondence affixing means for making, when the longitudinal direction edge position image of said first image is superimposed on the longitudinal direction edge position image of said second image in accordance with the results of registration by said pixel accuracy registration means, the pixels of the longitudinal direction edge position image of said second image which come into register with the respective edge pixels on the first longitudinal direction edge position image, reference edge pixels, and using said subpixel accuracy longitudinal direction edge position image to obtain a distance between edge pixels, and based on said distance, obtaining the corresponding candidate edge pixel group corresponding to said reference edge pixel, and repeatedly computing in said corresponding candidate edge pixel group, to obtain said corresponding candidate edge pixel group with respect to all of the edge pixels on said longitudinal direction edge position image, and when the transverse direction edge position image of said first image is superimposed on the transverse direction edge position image of said second image in accordance with the results of registration by said pixel accuracy registration means, making the pixels of the transverse direction edge position image of said second image which come into register with the respective edge pixels on the transverse direction edge position image of said first image, reference edge pixels, and then using said subpixel accuracy transverse direction edge position image to obtain the distance between edge pixels, and based on said distance, obtaining the corresponding candidate edge pixel group corresponding to said reference edge pixel, and repeatedly computing in said corresponding candidate edge pixel group, to obtain said corresponding candidate edge pixel group with respect to all of the edge pixels on said transverse direction edge position image, corresponding candidate curve generating means for fitting the subpixel accuracy edge positions of the respective edge pixels of said corresponding candidate edge pixel group with a curve described by a pre-assigned function shape and making this the corresponding candidate curve, and performing coordinate conversion so that the subpixel accuracy edge position of said reference edge pixel becomes the origin, and making said corresponding candidate curve in this coordinate system a relative corresponding candidate curve, and obtaining relative corresponding candidate curves for all of said longitudinal direction edge position images and said transverse direction edge position images, and misregistration computing means for plotting in one plane for all of the edge pixels of said first image, the respectively corresponding relative corresponding candidate curves of said second image, and obtaining at subpixel accuracy a point where all of the relative corresponding candidate curves intersect, or a point where all of the relative corresponding candidate curves are most concentrated, and making this a corresponding candidate intersection point, and then computing a displacement vector being a vector connecting from the origin of the coordinate system of the plotted plane to said corresponding candidate intersection point.

7. A recording medium which can be read by a computer and on which is stored a program for realizing;

a function for performing differentiation for each of said images, in a longitudinal direction and a transverse direction of each image, and generating a longitudinal differential image having absolute values of longitudinal differential values as pixel values, and a transverse differential image having absolute values of transverse differential values as pixel values, and generating a complete differential image from said longitudinal differential image and said transverse differential image, a function for obtaining longitudinal direction fitting ranges for said longitudinal differential image by scanning the pixel values in the longitudinal direction, and obtaining transverse direction fitting ranges for said transverse differential image by scanning the pixel values in the transverse direction, a function for fitting for each of said longitudinal fitting ranges on said longitudinal differential image, a mono-peak function in the longitudinal direction, and obtaining a coordinate of the maximum value point separated into subpixel accuracy being an accuracy of less than one pixel, and pixel accuracy, and making this the respective subpixel accuracy longitudinal direction edge position and the pixel accuracy longitudinal direction edge position, and with the pixel corresponding to said pixel accuracy longitudinal direction edge position as the edge pixel, generating a longitudinal direction edge position image having said subpixel accuracy longitudinal direction edge position as the pixel value of this edge pixel, and for each of said transverse fitting ranges on said transverse differential image, fitting a mono-peak function in the transverse direction, and obtaining the coordinate of the maximum value point separated into subpixel accuracy being an accuracy of less than one pixel, and pixel accuracy, and making this the respective subpixel accuracy transverse direction edge position and the pixel accuracy transverse direction edge position, and with the pixel corresponding to said pixel accuracy transverse direction edge position as the edge pixel, generating a transverse direction edge position image having said subpixel accuracy transverse direction edge position as the pixel value of this edge pixel, a function for generating a longitudinal differential image, a transverse differential image, a complete differential image, a longitudinal direction edge position image, and a transverse direction edge position image, respectively corresponding to images of the longitudinal differential image, the transverse differential image, the complete differential image, the longitudinal direction edge position image, and the transverse direction edge position image, which have been to pre-assigned sizes, a function for performing registration, for each of said complete differential images at an accuracy of one pixel by template matching, of the complete differential image of said first image with respect to the complete differential image of said second image, and in accordance with the result of this registration, registering at an accuracy of one pixel the longitudinal differential image, the transverse differential image, the longitudinal direction edge position image, and the transverse direction edge position image of said first image, with respect to the longitudinal differential image, the transverse differential image, the longitudinal direction edge position image, and the transverse direction edge position image of the second image, a function for making, when the longitudinal direction edge position image of said first image is superimposed on the longitudinal direction edge position image of said second image in accordance with the results of said registration at an accuracy of one pixel, the pixels of the longitudinal direction edge position image of said second image which come into register with the respective edge pixels on the longitudinal direction edge position image of said first image, reference edge pixels, and using said subpixel accuracy longitudinal direction edge position image to obtain a distance between edge pixels, and based on said distance, obtaining the corresponding candidate edge pixel group corresponding to said reference edge pixel, and repeatedly computing in said corresponding candidate edge pixel group, to obtain said corresponding candidate edge pixel group with respect to all of the edge pixels on said longitudinal direction edge position image, and when the transverse direction edge position image of said first image is superimposed on the transverse direction edge position image of said second image in accordance with the results of said registration at an accuracy of one pixel, making the pixels of the transverse direction edge position image of said second image which come into register with the respective edge pixels on the first transverse direction edge position image, reference edge pixels, and then using said subpixel accuracy transverse direction edge position image to obtain the distance between edge pixels, and based on said distance, obtaining the corresponding candidate edge pixel group corresponding to said reference edge pixel, and repeatedly computing in said corresponding candidate edge pixel group, to obtain said corresponding candidate edge pixel group with respect to all of the edge pixels on said transverse direction edge position image, a function for fitting the subpixel accuracy edge positions of the respective edge pixels of said corresponding candidate edge pixel group with a curve described by a pre-assigned function shape and making this the corresponding candidate curve, and performing coordinate conversion so that the subpixel accuracy edge position of said reference edge pixel becomes the origin, and making said corresponding candidate curve in this coordinate system a relative corresponding candidate curve, and obtaining relative corresponding candidate curves for all of said longitudinal direction edge position images and said transverse direction edge position images, and a function for plotting in one plane for all of the edge pixels of said first image, the respectively corresponding relative corresponding candidate curves of said second image, and obtaining at subpixel accuracy a point where all of the relative corresponding candidate curves intersect, or a point where all of the relative corresponding candidate curves are most concentrated, and making this a corresponding candidate intersection point, and then computing a displacement vector being a vector connecting from the origin of the coordinate system of the plotted plane to said corresponding candidate intersection point.

\* \* \* \* \*

UNITED STATES PATENT AND TRADEMARK OFFICE
CERTIFICATE OF CORRECTION

PATENT NO.     : 6,434,279 B1
DATED          : August 13, 2002
INVENTOR(S)    : Hisashi Shiba It is certified that error appears in the above-identified patent and that said Letters Patent is hereby corrected as shown below:

<u>Title page,</u>
Item [30], Foreign Application Priority Data, please correct the following:

-- Jun. 1, 1998 [JP] Japan…10-151505 --.

Signed and Sealed this

Twenty-fifth Day of March, 2003

JAMES E. ROGAN
*Director of the United States Patent and Trademark Office*